(12) United States Patent
Walker et al.

(10) Patent No.: US 11,432,654 B2
(45) Date of Patent: *Sep. 6, 2022

(54) LOWER BACK AND POSTURE SUPPORT DEVICE

(71) Applicant: Inter-Face Medical LLC, Okemos, MI (US)

(72) Inventors: Brock M. Walker, Okemos, MI (US); John Aldrich, Grandville, MI (US)

(73) Assignee: INTER-FACE MEDICAL LLC, Okemos, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/005,870

(22) Filed: Aug. 28, 2020

(65) Prior Publication Data

US 2020/0405061 A1 Dec. 31, 2020

Related U.S. Application Data

(63) Continuation of application No. 16/047,173, filed on Jul. 27, 2018, now Pat. No. 10,758,051.
(Continued)

(51) Int. Cl.
| A47C 7/16 | (2006.01) |
| A47C 7/42 | (2006.01) |
| B60N 2/66 | (2006.01) |
| A47C 7/46 | (2006.01) |
| B64D 11/06 | (2006.01) |
| A47C 31/11 | (2006.01) |
| B60N 2/60 | (2006.01) |
| A47C 7/40 | (2006.01) |

(52) U.S. Cl.
CPC .............. *A47C 7/425* (2013.01); *A47C 7/407* (2013.01); *A47C 7/46* (2013.01); *A47C 7/462* (2013.01); *A47C 31/11* (2013.01); *B60N 2/60* (2013.01); *B60N 2/663* (2015.04); *B60N 2/667* (2015.04); *B64D 11/0647* (2014.12)

(58) Field of Classification Search
CPC .......... A47C 7/425; A47C 7/46; A47C 7/462; A47C 7/029; B60N 2/66; B60N 2/914; B60N 2/6671
See application file for complete search history.

(56) References Cited

U.S. PATENT DOCUMENTS

| 1,510,187 A | 9/1924 | Martin |
| 1,667,626 A | 4/1928 | Epstein |

(Continued)

FOREIGN PATENT DOCUMENTS

| DE | 3334864 | 4/1985 |
| DE | G9317020.3 | 3/1994 |

(Continued)

OTHER PUBLICATIONS

Supplementary European Search Report dated Apr. 16, 2013 for EP07839308.
(Continued)

*Primary Examiner* — Shin H Kim
(74) *Attorney, Agent, or Firm* — Akerman LLP

(57) ABSTRACT

The present invention relates to a spine orienting device for integration into a variety of types of seats, for example, automotive seats or office type seating, in order to properly position the sacrum of the individual using the seat, which in turn will properly pivot the pelvis to assist in maintaining the spine in equilibrium.

16 Claims, 27 Drawing Sheets

Related U.S. Application Data

(60) Provisional application No. 62/580,180, filed on Nov. 1, 2017, provisional application No. 62/538,525, filed on Jul. 28, 2017.

(56) References Cited

U.S. PATENT DOCUMENTS

| | | |
|---|---|---|
| 1,716,871 A | 6/1929 | Weldon |
| 2,139,028 A | 12/1938 | Mensendicck et al. |
| 2,219,475 A | 10/1940 | Flaherty |
| 2,255,464 A | 9/1941 | Hall, Jr. |
| 2,554,337 A | 5/1951 | Lampert |
| 2,663,359 A | 12/1953 | Wood |
| 2,756,808 A | 7/1956 | Eichorst |
| 2,769,485 A | 11/1956 | Shapiro |
| 2,831,533 A | 4/1958 | Pasquarelli |
| 2,847,061 A | 8/1958 | Morton |
| 2,855,986 A | 10/1958 | Engelen, Sr. |
| 3,024,784 A | 3/1962 | Monfardini |
| 3,081,129 A | 3/1963 | Ridder |
| 3,112,137 A | 11/1963 | Nth |
| 3,138,404 A | 6/1964 | Newton |
| 3,145,054 A | 8/1964 | Spoko, Jr. |
| 3,189,917 A | 6/1965 | Sims |
| 3,288,525 A | 11/1966 | Cerf |
| 3,348,880 A | 10/1967 | Swann |
| 3,362,402 A | 1/1968 | Loeffel et al. |
| 3,497,872 A | 3/1970 | Mitchell |
| 3,501,197 A | 3/1970 | Burton |
| 3,512,835 A | 5/1970 | Flototto |
| 3,540,776 A | 11/1970 | Wilson |
| 3,568,670 A | 3/1971 | Gaylor, Jr. |
| 3,642,319 A | 2/1972 | Berchicci |
| 3,657,739 A | 4/1972 | Holmes, Sr. |
| 3,713,657 A | 1/1973 | Presta |
| 3,717,143 A | 2/1973 | Johnson |
| 3,720,441 A | 3/1973 | Corchran |
| 3,740,096 A | 6/1973 | Bridger |
| 3,807,794 A | 4/1974 | Beyer |
| 3,855,631 A | 12/1974 | Ettinger |
| 3,900,896 A | 8/1975 | Ackerman |
| 3,904,242 A | 9/1975 | Koepke et al. |
| 3,926,183 A | 12/1975 | Spiro |
| 3,927,665 A | 12/1975 | Wax |
| 3,964,474 A | 6/1976 | Fox |
| 3,982,786 A | 9/1976 | Burgin et al. |
| 4,017,118 A | 4/1977 | Cawley |
| 4,034,747 A | 7/1977 | Leroy |
| 4,078,842 A | 3/1978 | Zur |
| 4,099,524 A | 7/1978 | Cueman et al. |
| 4,156,544 A | 5/1979 | Swenson et al. |
| 4,175,553 A | 11/1979 | Rosenberg |
| 4,182,553 A | 1/1980 | Arndt et al. |
| 4,219,193 A | 8/1980 | Newman |
| 4,295,681 A | 10/1981 | Gregory |
| 4,313,637 A | 2/1982 | Barley |
| 4,338,685 A | 7/1982 | LaPorta, Jr. |
| 4,437,702 A | 3/1984 | Agosta |
| 4,471,993 A | 9/1984 | Watson |
| 4,475,543 A | 10/1984 | Brooks et al. |
| 4,489,982 A | 12/1984 | Morrow |
| D277,316 S | 1/1985 | Meares |
| 4,501,023 A | 2/1985 | Bilberry |
| 4,502,728 A | 3/1985 | Sheldon et al. |
| 4,516,568 A | 5/1985 | Baxter et al. |
| 4,522,447 A | 6/1985 | Snyder et al. |
| 4,535,495 A | 8/1985 | Oldfield |
| 4,556,254 A | 12/1985 | Roberts |
| 4,559,933 A | 12/1985 | Batard et al. |
| 4,564,235 A | 1/1986 | Hatsutta et al. |
| 4,572,578 A | 2/1986 | Perkins |
| 4,576,154 A | 3/1986 | Hyman et al. |
| 4,597,386 A | 7/1986 | Goldstein |
| 4,634,176 A | 1/1987 | Scott |
| 4,638,510 A | 1/1987 | Hubbard |
| 4,643,174 A | 2/1987 | Horiuchi |
| 4,715,362 A | 12/1987 | Scott |
| 4,718,724 A | 1/1988 | Quinton et al. |
| 4,752,067 A | 6/1988 | Colonello |
| 4,753,478 A | 6/1988 | Weinreich |
| D296,930 S | 7/1988 | Carabelli |
| 4,757,554 A | 7/1988 | Blair |
| 4,789,202 A | 12/1988 | Alter |
| 4,821,339 A | 4/1989 | Fair |
| 4,824,169 A | 4/1989 | Jarrell |
| 4,835,801 A | 6/1989 | Walpin et al. |
| 4,836,194 A | 6/1989 | Sebastian et al. |
| 4,854,306 A | 8/1989 | Pujals, Jr. |
| 4,862,536 A | 9/1989 | Pruit |
| 4,870,705 A | 10/1989 | Higby et al. |
| 4,876,755 A | 10/1989 | Parrish |
| 4,881,529 A | 11/1989 | Santos |
| 4,883,320 A | 11/1989 | Izumida et al. |
| 4,890,235 A | 12/1989 | Reger et al. |
| 4,926,845 A | 5/1990 | Harris |
| 4,930,499 A | 6/1990 | Rowe |
| 4,944,554 A | 7/1990 | Gross et al. |
| 4,969,684 A | 11/1990 | Zarotti |
| 4,981,325 A | 1/1991 | Zacharkow |
| 4,996,720 A | 3/1991 | Fair |
| 5,054,854 A | 10/1991 | Pruit |
| D321,760 S | 11/1991 | Carney |
| D325,087 S | 3/1992 | Brinker |
| 5,105,806 A | 4/1992 | Woodhouse et al. |
| 5,114,209 A | 5/1992 | Dunn |
| 5,188,585 A | 2/1993 | Peters |
| 5,190,347 A | 3/1993 | Shiow-Lan |
| 5,201,761 A | 4/1993 | Serola |
| 5,240,308 A | 8/1993 | Goldstein et al. |
| 5,314,235 A | 5/1994 | Johnson |
| 5,320,409 A | 6/1994 | Katoh et al. |
| 5,328,245 A | 7/1994 | Marks et al. |
| 5,335,965 A | 8/1994 | Sessini |
| 5,397,164 A | 3/1995 | Schuster et al. |
| 5,452,728 A | 9/1995 | Iams |
| 5,452,940 A | 9/1995 | Maier |
| 5,505,520 A | 4/1996 | Frusti et al. |
| 5,518,294 A | 5/1996 | Ligon, Sr. et al. |
| 5,520,624 A | 5/1996 | Amato |
| 5,547,251 A | 8/1996 | Axelson |
| 5,556,169 A | 9/1996 | Parrish et al. |
| 5,567,010 A | 10/1996 | Sparks |
| 5,567,011 A | 10/1996 | Sessini |
| 5,577,811 A | 11/1996 | Ogg |
| 5,586,561 A | 12/1996 | Archer, III |
| 5,587,933 A | 12/1996 | Gross |
| 5,588,703 A | 12/1996 | Itou |
| 5,626,616 A | 5/1997 | Speece |
| 5,657,499 A | 8/1997 | Vaughn et al. |
| 5,678,891 A | 10/1997 | O'Neill et al. |
| 5,695,245 A | 12/1997 | Carlson et al. |
| 5,704,687 A | 1/1998 | Klinger |
| 5,713,631 A | 2/1998 | O'Neill et al. |
| 5,718,476 A | 2/1998 | De Pascal et al. |
| 5,762,397 A | 6/1998 | Venuto et al. |
| 5,823,620 A | 10/1998 | Le Caz |
| 5,833,319 A | 11/1998 | Davis |
| 5,868,463 A | 2/1999 | MacKenzie et al. |
| 5,868,466 A | 2/1999 | Massara et al. |
| 5,975,629 A | 11/1999 | Lorbiecki |
| 6,033,025 A | 3/2000 | Christofferson et al. |
| 6,041,457 A | 3/2000 | Summers |
| 6,059,370 A | 5/2000 | Kanyer et al. |
| 6,088,643 A | 7/2000 | Long et al. |
| 6,092,249 A | 7/2000 | Kamen et al. |
| 6,092,871 A | 7/2000 | Beaulieu |
| 6,098,000 A | 8/2000 | Long et al. |
| 6,125,851 A | 10/2000 | Walker et al. |
| 6,129,419 A | 10/2000 | Neale |
| 6,206,463 B1 | 3/2001 | Whingham |
| 6,257,664 B1 | 7/2001 | Chew et al. |
| 6,334,651 B1 | 1/2002 | Duan et al. |
| 6,497,454 B1 | 12/2002 | Davidsson |
| 6,532,962 B1 | 3/2003 | Walker et al. |

(56) References Cited

U.S. PATENT DOCUMENTS

| | | |
|---|---|---|
| 6,543,844 B1 | 4/2003 | Ryan et al. |
| 6,578,916 B2 | 6/2003 | Longhi et al. |
| 6,619,739 B2 | 9/2003 | McMillen |
| 6,652,029 B2 | 11/2003 | McMillen |
| 6,676,215 B1 | 1/2004 | Shah et al. |
| 6,695,402 B2 | 2/2004 | Sloan, Jr. |
| 6,824,214 B2 | 11/2004 | McMillen |
| 6,969,114 B2 | 11/2005 | Keilhauer |
| 7,093,898 B2 | 8/2006 | Ladron De Guevara |
| 7,140,057 B2 | 11/2006 | Hetzel et al. |
| 7,152,920 B2 | 12/2006 | Sugiyama et al. |
| 7,273,252 B2 | 9/2007 | Iijima et al. |
| 7,322,651 B2 | 1/2008 | Makhsous et al. |
| 7,429,080 B2 | 9/2008 | Walker et al. |
| 7,445,008 B1 | 11/2008 | Walker |
| 7,537,286 B2 | 5/2009 | Walker et al. |
| 7,909,402 B2 | 3/2011 | Chu et al. |
| 7,931,334 B1 | 4/2011 | Caruso |
| 8,011,044 B1 | 9/2011 | Jones |
| 8,398,170 B2 | 3/2013 | Walker |
| 2002/0008417 A1 | 1/2002 | Holst et al. |
| 2002/0109383 A1 | 8/2002 | Klingler |
| 2002/0175553 A1 | 11/2002 | Steifensand |
| 2003/0197407 A1 | 10/2003 | Sanchez |
| 2004/0075320 A1 | 4/2004 | Klinger |
| 2005/0104428 A1 | 5/2005 | Walker et al. |
| 2006/0001304 A1 | 1/2006 | Walker et al. |

FOREIGN PATENT DOCUMENTS

| | | |
|---|---|---|
| DE | 29922030 | 7/2000 |
| DE | 10114521 | 9/2002 |
| DE | 20305074 U1 | 8/2004 |
| EP | 0423079 | 10/1990 |
| EP | 0700653 | 3/1996 |
| EP | 1611819 A1 | 1/2006 |
| FR | 2469315 A3 | 5/1981 |
| JP | 03029610 | 4/1991 |
| JP | 08191734 | 7/1996 |
| JP | 2002360375 | 12/2002 |
| KR | 2015 0021341 A | 3/2015 |
| WO | WO 92/14387 | 9/1992 |
| WO | WO 2001/56428 | 8/2001 |
| WO | WO 02/028339 | 4/2002 |
| WO | WO 2004/026623 | 4/2004 |
| WO | WO 2004/089693 | 10/2004 |
| WO | WO 2019/023544 | 1/2019 |

OTHER PUBLICATIONS

International Search Report and Written Opinion dated Feb. 27, 2008 for PCT/US2007/021437 filed Oct. 5, 2007.
European Communication Pursuant to Article 94(3) in European Application No. 07 839 308.9 dated Jun. 13, 2014.
ISR and Written Opinion dated Sep. 20, 2018.

FIG. 5C
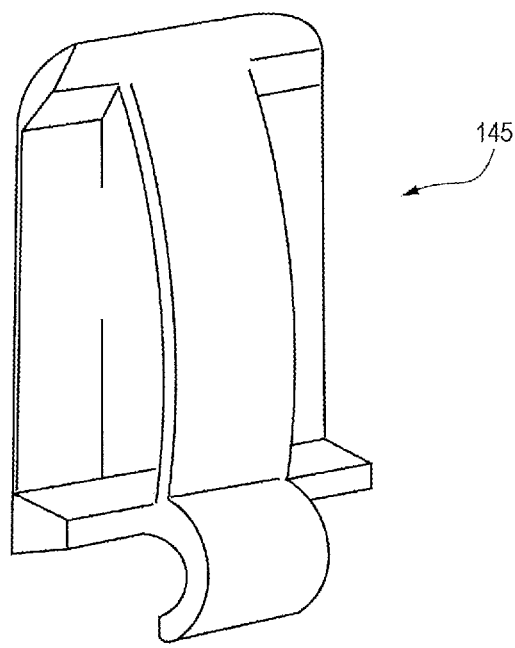
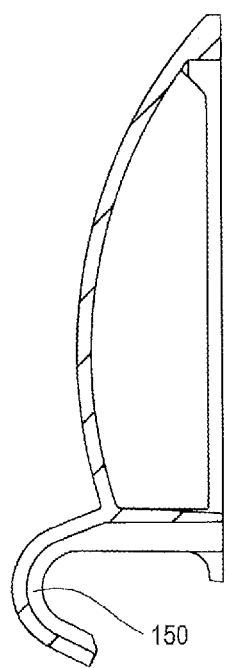

FIG. 21
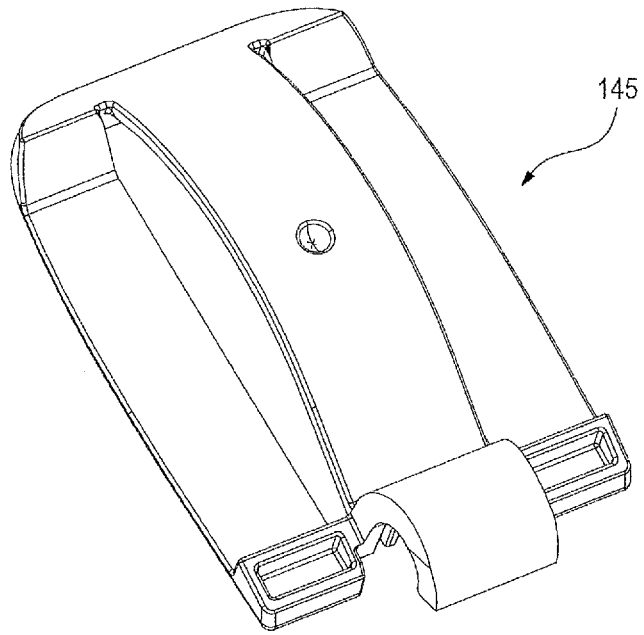
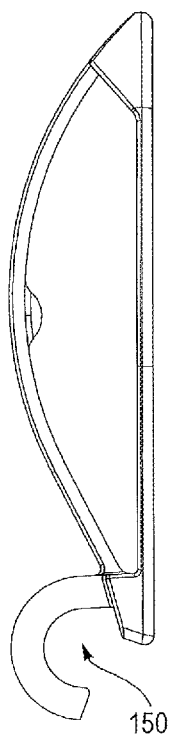

FIG. 24
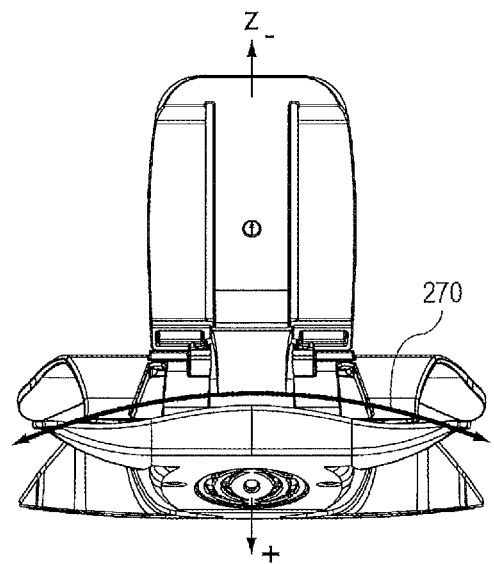
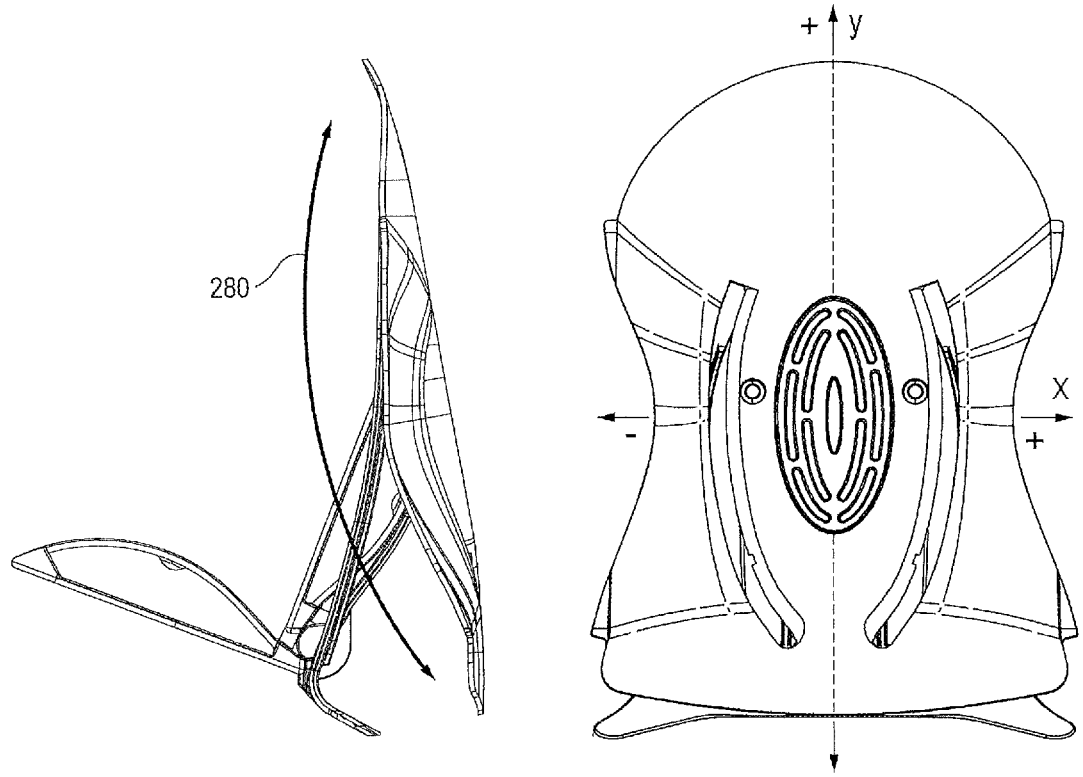

LOWER BACK AND POSTURE SUPPORT DEVICE

CROSS REFERENCE TO RELATED APPLICATIONS

This is a continuation of U.S. application Ser. No. 16/047,173, which claims the benefit of U.S. Provisional Application Ser. No. 62/538,525 filed Jul. 28, 2017, and U.S. Provisional Application Ser. No. 62/580,180 filed Nov. 1, 2017, the disclosure of each of which is hereby incorporated herein by reference in its entirety.

COPYRIGHT NOTICE

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

BACKGROUND

The present invention relates to a spine orienting and supporting device for use with a variety of types of seats, for example, automotive seats, heavy truck seats, airline seats, mass transit seats or office type seating, in order to properly position and support the sacrum, which in turn will properly position the spine of the individual using the seat. The spine orienting and supporting device, preferably made from thermoplastics, adjusts and/or supports the sacrum thereby orienting the pelvis to assist in maintaining the spine in neutral equilibrium. In some embodiments, the support is preferably separate from the seat and includes a main body and a support frame. In other embodiments, the support is preferably integrated into the frame of the existing seat of interest. The main body has a vented center relief area that flexes to relieve and/or redistribute localized pressure from the spine and to support the user's sacrum. In other embodiments, the center relief area of the main body is optionally vented. In still other embodiments, preferably in embodiments where the support is integrated into the seat frame, venting of the center relief area of the main body is typically not required and generally can be omitted, essentially providing an enlarged center relief portion absent any venting over the space occupied by both the center relief area and center relief portion. The integrated main body and support frame properly locate the device on the seat while providing resistance or pressure relief to different positions of the user's lower spine and pelvis, creating a spine orientation that is more conducive to user comfort, leading to reductions in work fatigue. The device will also fill an otherwise empty space between the bottom and rear seat sections, thereby further improving posture while seated.

Many types of spine supporting devices have been previously suggested. Primarily these have ranged from those that extend across the whole lumbar region to others that extend upwardly to fit against the upper back. Such devices have typically been in the form of a pillow or a shaped seat that will tend to fit the curvature of the lumbar region of a person's spine when seated in that seat.

Other types of spine supporting devices focus on the sacral region of the spine. Among these are U.S. Pat. Nos. 7,429,080 and 7,445,008. U.S. Pat. No. 7,429,080 is directed to a sacral support assembly for use with a seat and is reported to provide adjustable, stabilizing support to a user's sacrum and sacral-pelvic anatomy to reduce fatigue, increase comfort, stability and posture for a user, and a system for adjusting and controlling the load distribution from the sacral anatomy to the anatomical structures adjacent to a user's sacrum, for example, the pelvis and lumbar regions. U.S. Pat. No. 7,445,008 discloses a cushion for use with a variety of types of seats that can adjust the sacrum to assist in maintaining the spine in equilibrium. The central area of the cushion has a plurality of inserts that individually have varying compressibility. Through the use of such inserts or devices, a user can select an insert most nearly suited to the user and the seat to provide a compression result providing sufficient pressure concentrated on the sacrum of the user to properly position the sacrum.

Common types of seating products do not meet user expectations for lower back comfort and support. Seating comfort is a key reason for users to purchase these products or use these products. In order to improve lower back comfort, manufacturers often add additional support in the lumbar region of the seat back via contouring of the cushion, or by adding adjustable lumbar support devices to the seat back, under the cushion and upholstery. These lumbar contour changes or lumbar support devices may provide users short term comfort and relief of lower back pain, but they generally do not provide long term comfort and pain relief at least in part due to their shape and location in relation to the users spine.

BRIEF SUMMARY

The present invention is directed, in part, to portable sacral support devices comprising a main body, wherein the main body comprises a vented center relief portion surrounded by and connected to a center support portion; relief arms disposed laterally to the center support portion; an upper support portion connected to the center support portion and the relief arms; and a support skirt connected to the center support portion and to the relief arms; and a support frame attached to the main body, the support frame comprising an outer arch; an inner arch medial to the outer arch; and a pedestal connected to the inner and outer arches.

The present invention is also directed, in part, to integrated sacral support devices comprising a main body, wherein the main body comprises an optionally vented center relief portion surrounded by and connected to a center support portion; relief arms disposed laterally to the center support portion; an upper support portion connected to the center support portion and the relief arms; and a support skirt connected to the center support portion and to the relief arms; and a support frame attached to the main body, the support frame comprising an outer arch; an inner arch medial to the outer arch. In such embodiments where the support device is integrated, a pedestal is not typically required, but rather, the inner and outer arches are conjoined at the base portion of the support frame.

The present invention relates to spine-orienting devices for use with a variety of types of seats, for example, automotive seats, heavy truck seats, airline seats, mass transit seats or office type seating, in order to properly position and support the sacrum, which in turn will properly position and/or orient the spine of the individual using the seat. The devices are designed to be positioned in the gap or opening between the seat pan and the seat back and aligned to the centerline of the seat. The spine-orienting and/or supporting devices, preferably made from thermoplastics, adjusts and/or the sacrum thereby orienting the pelvis to assist in maintaining the spine in neutral equilibrium. In certain embodiments, the support devices are preferably separate from the seat and include a main body and a support frame, while in others, they are preferably directly attached and/or otherwise integrated into the frame of the seat of choice. In some embodiments, the main body has a slotted center relief area that flexes to provide resistance or pressure relief to different positions of the user's lower spine, creating a spine orientation that is more conducive to user comfort, leading to reductions in work fatigue. The device also fills an otherwise empty space between the bottom and rear seat sections, thereby further improving posture while seated. It was found that with many types of seating, for example, automotive seats, heavy truck seats, airline seats, mass transit seats or office type seating, there is usually a relatively large gap between certain portions of the seat back and the posterior of the seat user proximate to the user's sacral region. When the sacral area of the seat user's spine remains unsupported, the risk of fatigue, back pain and other related problems increases. The inventors have found that the prevalence of these conditions that may otherwise develop may be avoided through use of portable, or alternatively through integrated devices that work with a variety of seat types. Because individuals vary widely in terms of their total body weight, their frame size, and the amount of support necessary to achieve some measure of relief, the support devices would also need to be adjustable to each individual and to each seating environment.

This invention is directed to these and other important ends, and further achieves those requirements. The invention is a molded thermoplastic spinal support device that is easy to use, provides the ability to produce the desired isolated forces and relief on targeted sacral sub-regions of the user's anatomy, yet permits easy adjustment and fit to an individual user's back support requirements. Additionally, the present invention also achieves its effectiveness in being able to correctly position a user's sacrum in a variety of types of seats.

The molded device includes a main body, having an optionally vented center relief portion surrounded by and connected to a center support portion, relief arms disposed laterally to the center support portion, an upper support portion connected to the center support portion and the relief arms, and a support skirt connected to the center support portion and to the relief arms. In addition to the main body, the device also includes a support frame attached to the main body. The support frame comprises an outer arch; an inner arch medial to the outer arch, and a pedestal connected to the inner and outer arches.

The desired level for such an applied, and isolated, readjusting force should be enough to properly reposition the sacrum, yet not so much as might result in pain or discomfort to the user. The proper level of support, relief and/or pressure redistribution will be that which will make the support device virtually disappear as an additional seat component. Additionally, the main body is designed to permit those portions of the body adjacent the sacrum to be relatively less supported. While the sacrum itself needs to be supported, the adjacent body structure will desirably be able to move rearwardly, or fall back, by an amount needed to achieve the desired level of pelvic pivot to properly orient the spine.

Other objects, features, and characteristics of the present invention will become apparent upon consideration of the following description in the appended claims with reference to the accompanying drawings, all of which form a part of the specification, and wherein like reference numerals designate corresponding parts in the various figures.

BRIEF DESCRIPTION OF THE DRAWINGS

The invention is better understood by reading the following detailed description with reference to the accompanying drawings in which:

FIG. 5C includes perspective and side views of an optional clip for an embodiment of the present invention;

FIG. 21 includes rear perspective and side views of an embodiment of a seat clip of the present invention;

FIG. 24 is a view of orientation and direction definitions for embodiments of the present invention.

DETAILED DESCRIPTION OF THE DRAWINGS AND THE PRESENTLY PREFERRED EMBODIMENTS

As used herein, the modifier "rearward or "rearwardly" refers to movement toward a seat back when the device is placed in use. For example, the rearward face of the main body is that face more proximate to the seat back. The term "rearward curving denotes that the arch is curving in the direction of the seat back. Conversely, an element curving "forward" denotes the element curving away from (in a direction forward of and distil to) the seat back in use.

As used herein, the term "thermoplastic" refers to a plastic material, or thermosoftening plastic, typically a polymer, that becomes pliable or moldable above a specific temperature and solidifies upon cooling. The intermolecular forces of the thermoplastic material weaken rapidly with increased temperature, allowing them to be reshaped by heating and are typically used to produce parts by various polymer processing techniques such as injection molding, compression molding, calendaring, and extrusion.

As used herein, the term "viscoelastic" refers to a material that exhibits both viscous and elastic properties when undergoing deformation, and, as such, exhibit time-dependent strain. Viscous materials, like honey, resist shear flow and strain linearly with time when a stress is applied. A viscoelastic substance changes shape when a stress is put on it and goes back to its original state when the stress is removed after a period of time.

As used herein, the term "flex modulus" refers to an intensive property that is computed as the ratio of stress to strain in flexural deformation, or the tendency for a material to bend. It is determined from the slope of a stress-strain curve produced by a flexural test (such as the ASTM D790 or ISO 178), and uses units of force per area.

As used herein, the term "elastomer", or "thermoplastic elastomer", or alternately "thermoplastic rubber" belong to a class of copolymers or a physical mix of polymers (usually a plastic and a rubber) which consist of materials with both thermoplastic and elastomeric properties. While most elastomers are thermosets, thermoplastics are in contrast relatively easy to use in manufacturing, for example, by injection molding. Thermoplastic elastomers show advantages typical of both rubbery materials and plastic materials. One benefit of using thermoplastic elastomers is the ability to stretch to moderate elongations and return to its near original shape creating a longer life and better physical range than other materials.

LIST OF ELEMENTS

Figure 19:
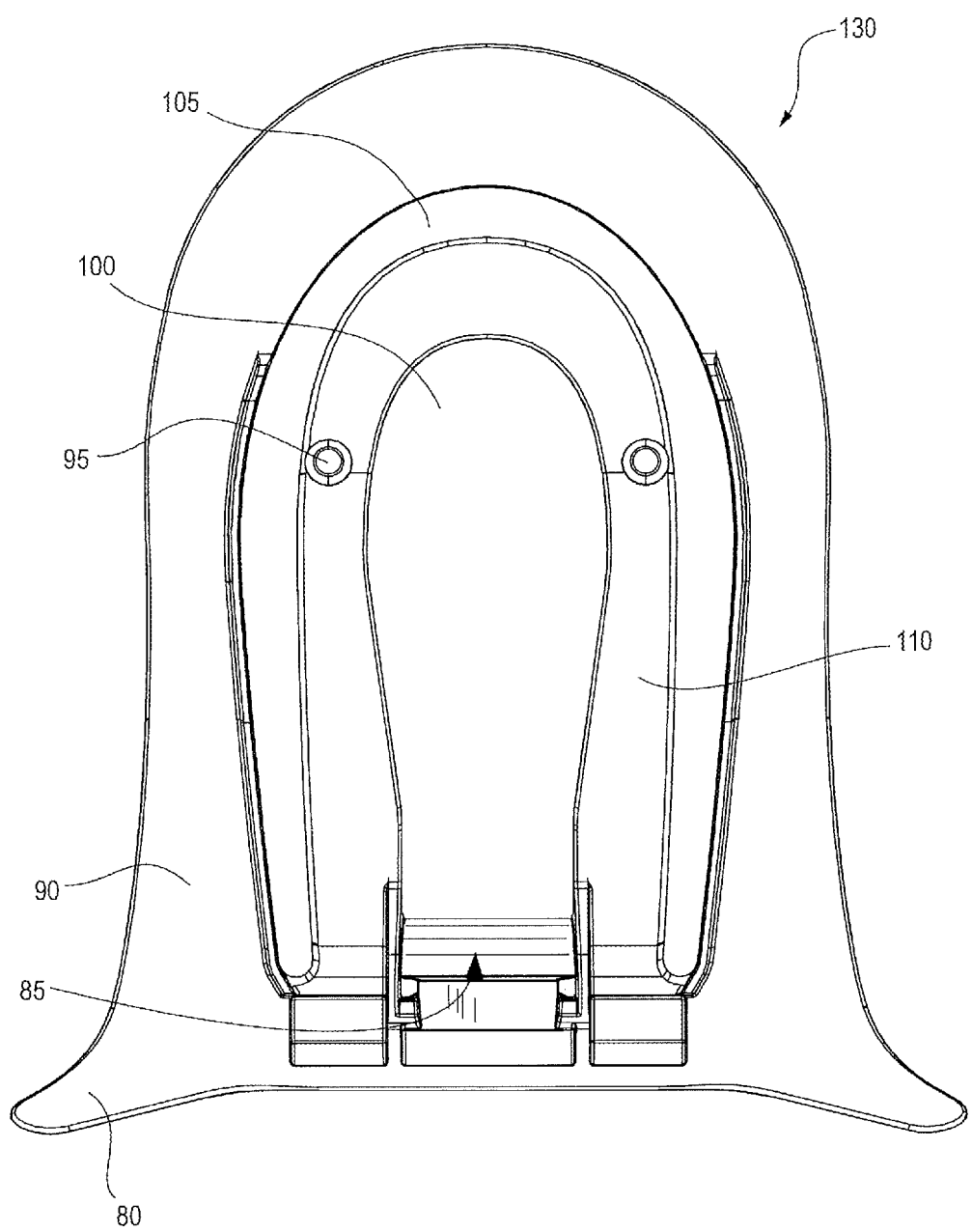
FIG. 19 is a front elevational view of a support frame of an embodiment of the present invention.
Figure 20:
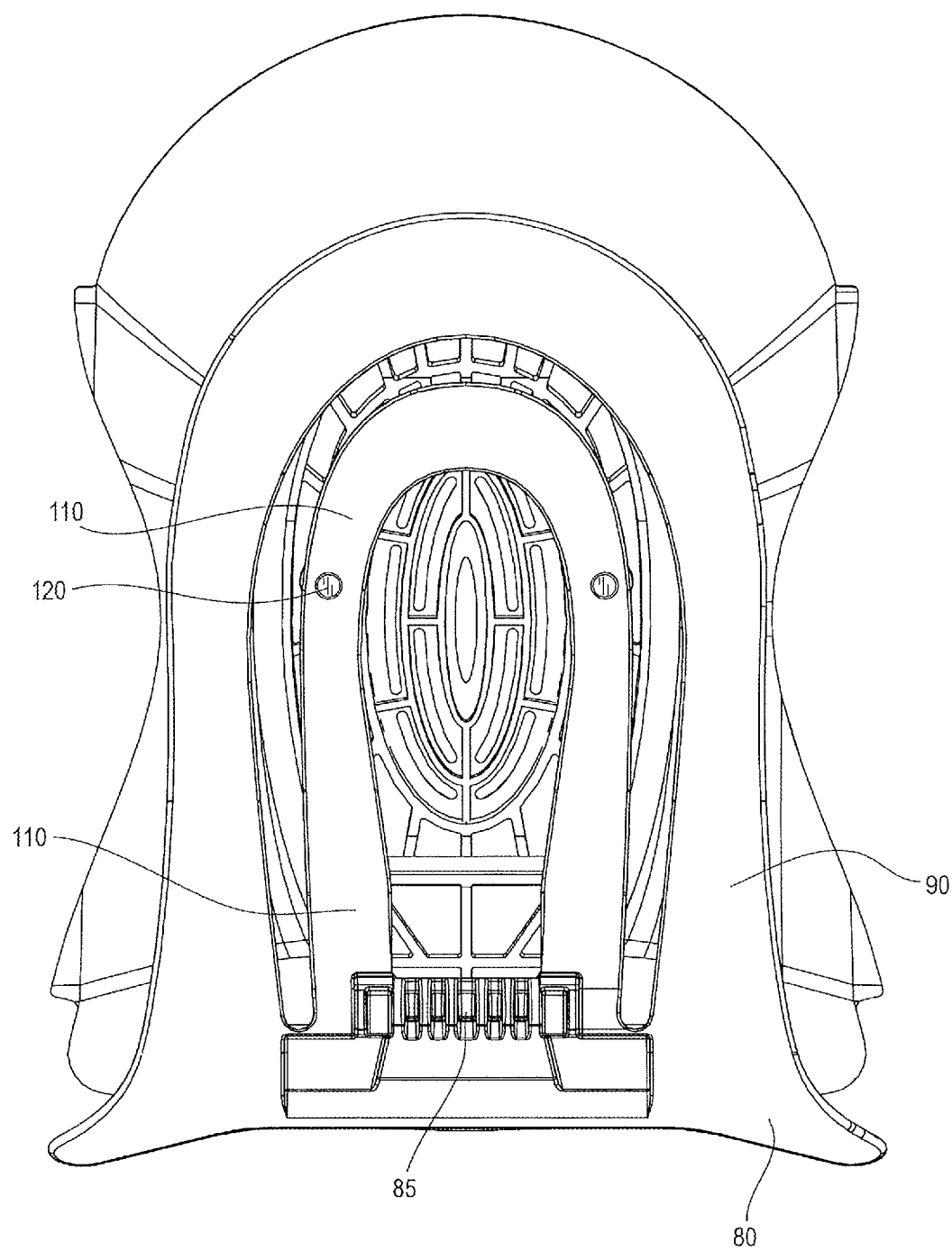
FIG. 20 is a rear elevational view of an embodiment of the present invention.

1 lower back and posture support device
2 main body
5 support skirt
10 center relief portion
15 center support portion
20 and 20a curved slots
25 and 25a left and right relief arms
30 upper support portion
35 support skirt ribbing
40 rear face of support skirt
45 slots of center relief portion
50 ribbing of center relief portion
55 notching in support skirt ribbing
60 upper notch for cushion
65 lower notch for cushion
70 Ribbing for center support portion
75 notching in lateral ribs of upper support portion
75a lateral ribs of upper support portion
80 pedestal
85 protrusion
90 outer arch
95 orifices in inner arch for attaching support frame to main body
100 portal
105 horseshoe-shaped slot
110 inner arch
115 slot
120 rivet
125 and 125a outer edges of relief arms
130 support frame
140 notching in center support portion ribbing
145 seat clip
150 hook
155 cover
160 cover upper pocket
165 cover lower pocket
170 cover tab
175 support frame for integrated device
180 seat support frame
185 seat cushioning and/or fabric seat covering
190 springs or suspension in the back frame assembly
195 integrated device main body center support portion
200 base portion of integrated device support frame where inner and outer arch are conjoined
205 orifice(s) in main body for attaching main body of an integrated device embodiment to its support frame
210 exemplary options for attachment features and locations of the integrated device support frame to the seat back support frame, springs, and/or suspension
220 L4, L5 vertabrae
230 pelvis
240 PSIS prominence
250 sacrum
260 outline of a main body of a back support device oriented over the pelvis and spine of a seated occupant
270 +Y axis bend/flex
280 +X axis bend/flex Embodiments of the portable sacral support device of the present invention include a main body 2 and a support frame 130 attached to the main body 2. The main bodies in these embodiments have a center support portion, an upper support portion connected to the center support portion, and a support skirt connected to the center support portion. The main bodies may also include at least one of, and preferably each of the following: (1) a vented center relief portion surrounded by and connected to the center support portion; and (2) relief arms disposed laterally to the center support portion and/or connected to the support skirt portion. The support frames attached to the main bodies in these embodiments includes an inner arch and a pedestal connected to the inner arch. The support frames may further include an outer arch. In certain embodiments, the support frame comprises an outer arch; an inner arch medial to the outer arch, wherein the outer arch and the inner arch are connected to the pedestal. Turning to the drawings, principally FIGS. 1-4, 11 and 12, the main body 2 of the exemplary portable support device 1, generally shown in FIG. 1, includes a slotted (or vented) center relief portion 10 (slots 45) connected to a center support portion 15, left and right relief arms 25 and 25a, respectively, disposed laterally to the center support portion 15, an upper support portion 30 connected to the center support portion 15 and to the relief arms 25 and 25a, and a support skirt 5 connected to the center support portion 15 and to the relief arms 25 and 25a. It is preferred that the support device 1 be a molded product that is formed through one of a number of conventional molding techniques. The outer edge (125, 125a) of each relief arm (25, 25a) is laterally curved toward the midpoint of the center relief portion 10 such that the width of the main body 2 as defined by each relief arm outer edge's inner most point (the waist) is more narrow than the width of the main body's upper support portion 30 and/or its skirt 5. Each relief arm (25, 25a) forms an arc rearwardly curving between its connections to the main body's upper support portion 30 and skirt 5. The center support portion 15, upper support portion 30, skirt 5 and left relief arm 25 together define a curved slot 20 in the main body. Similarly, the center support portion 15, upper support portion 30, skirt 5 and right relief arm 25a together define a curved slot 20a in the main body 2 that mirrors slot 20 about the main body's y-axis. The center support portion 15 is substantially flat and acts to support the user's sacrum as well as provide the means for connecting the main body 2 with the support frame. The center support portion deflects rearward against the inner arch when pressure is applied from the user. The center support portion when viewed in conjunction with its rearward surface's ribs, is thicker so that the center support portion resists bending and remains flat. The laterally disposed relief arms deflect forward against the outer arch when pressure is applied to the center support portion from the user. The shape of the laterally disposed relief arms work to provide relief around the user's posterior-superior-iliac-spine (PSIS) prominence, at least in part by the narrow waist of the main body and/or the rearwardly curved arc. The upper support portion surface reacts and flexes against the user's lower lumbar vertebrae, conforming to the user's back regions at, proximate and/or adjacent to the lumbar vertebrae, generally L4 and/or L5, to relieve and or redistribute pressure, while the support skirt reacts and flexes against the user's buttocks, conforming to the user's buttocks shape. The one or more slots 45 in the center relief portion 10 allow it a further degree of flex rearwardly in addition to any flex inherent in the material used to mold the main body. This additional flex assists the device in relieving or redistributing localized pressure exerted by the sacral portion of the spine or belt loops and belts on the user's trousers when the device is in contact with the user's back. The main body 2 also includes means, preferably rivets 120 for attaching the main body 2 to the support frame 130. The means for attaching the main body 2 to the support frame 130 is not critical so long as it is strong enough to maintain the attachment and does not otherwise interfere with the function of the device or its comfort to the user. Exemplary means include rivets, which may be made of metal, preferably steel, and may be constructed of carbon steel or the like for ease of manufacturing and/or the minimization of overall manufacturing costs. Exemplary connecting orifices are shown in FIG. 19 through which attaching means are employed to attach the main body to exemplary corresponding orifices 95 in the seat support frame.

Figure 18:
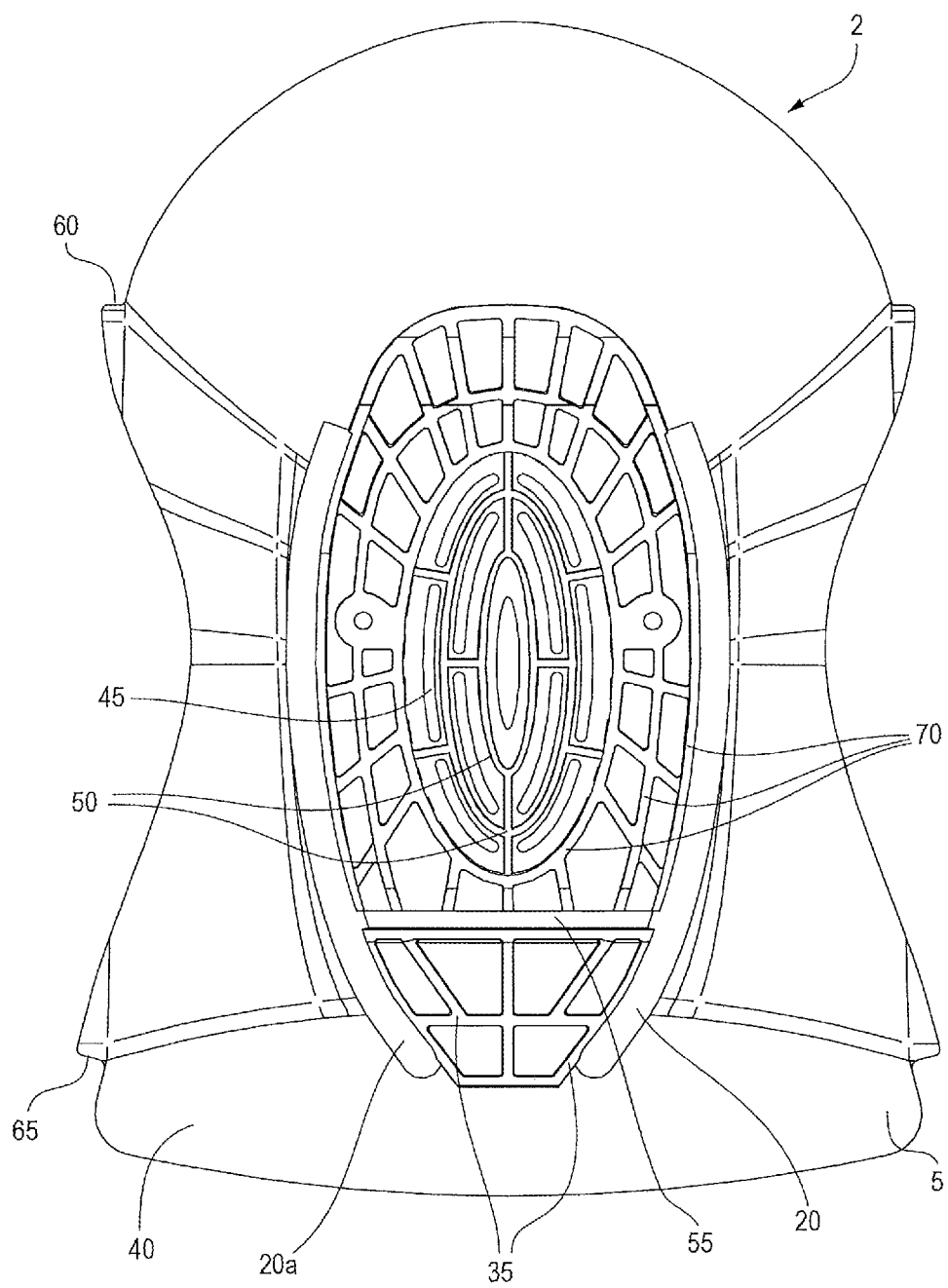
FIG. 18 is a rear elevational view of a main body of an embodiment of the present invention.

The rearward surface (shown in FIG. 2) of the main body 2 comprises a series of ribs. Certain of the ribs 50 are associated with the vented (or slotted) center relief portion, and some of the ribs 70 are associated with the center support portion. Other ribs 35 and 75a, respectively, are associated with the support skirt 5 or with the upper support portion 30. In an alternate embodiment, the rearward surface (shown in FIG. 18) of the main body 2 comprises a series of ribs, wherein certain of the ribs 50 are associated with the vented (or slotted) center relief portion, and some of the ribs 70 are associated with the center support portion. Other ribs 35 are associated with the support skirt 5. In either embodiment, the ribs, at least in part as a function of their size and/or quantity, independently provide structure, rigidity and/or stiffness to the molded material in the various portions of the main body.

Figure 2:
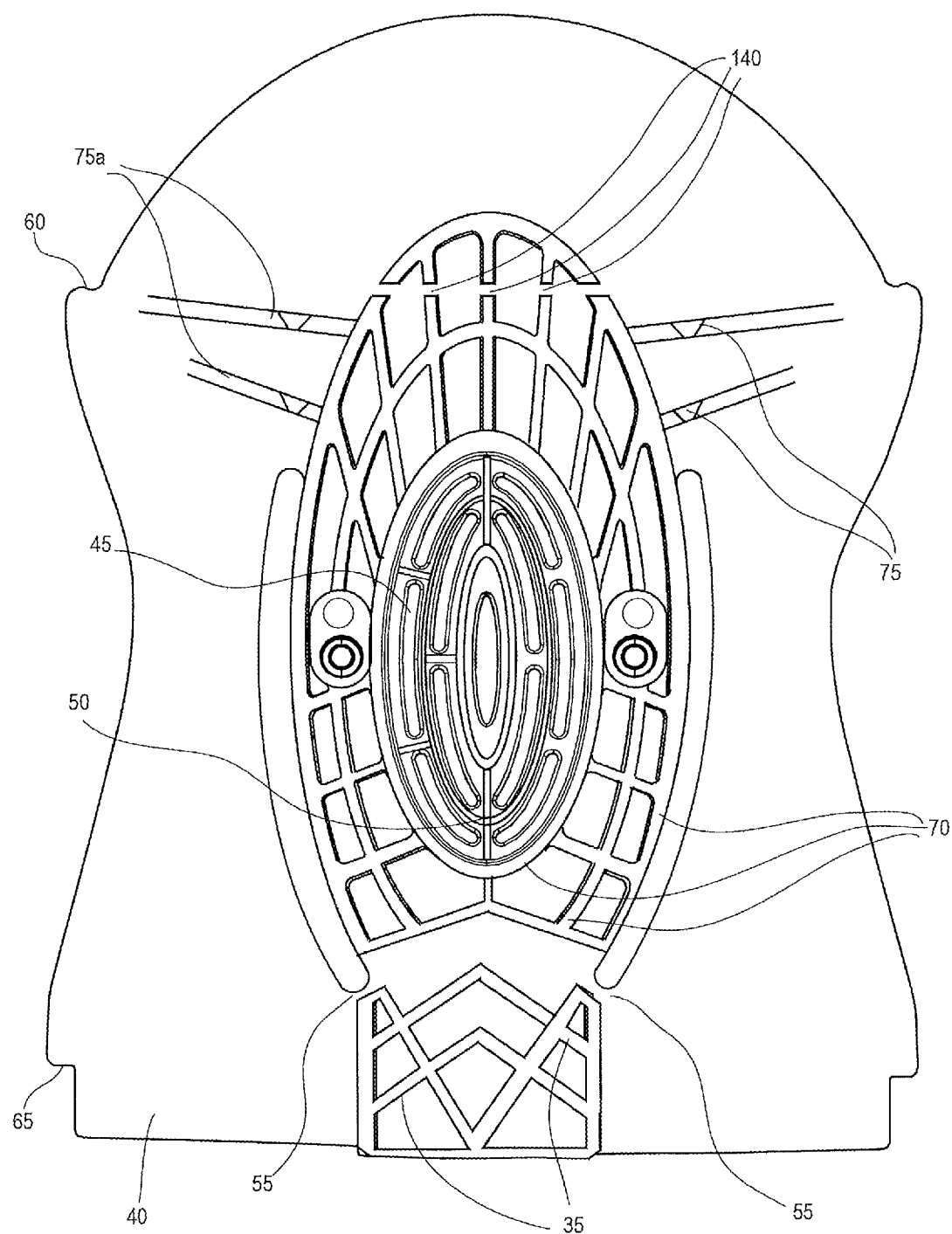
FIG. 2 is a rear elevational view of a main body of an embodiment of the present invention.
Figure 3:
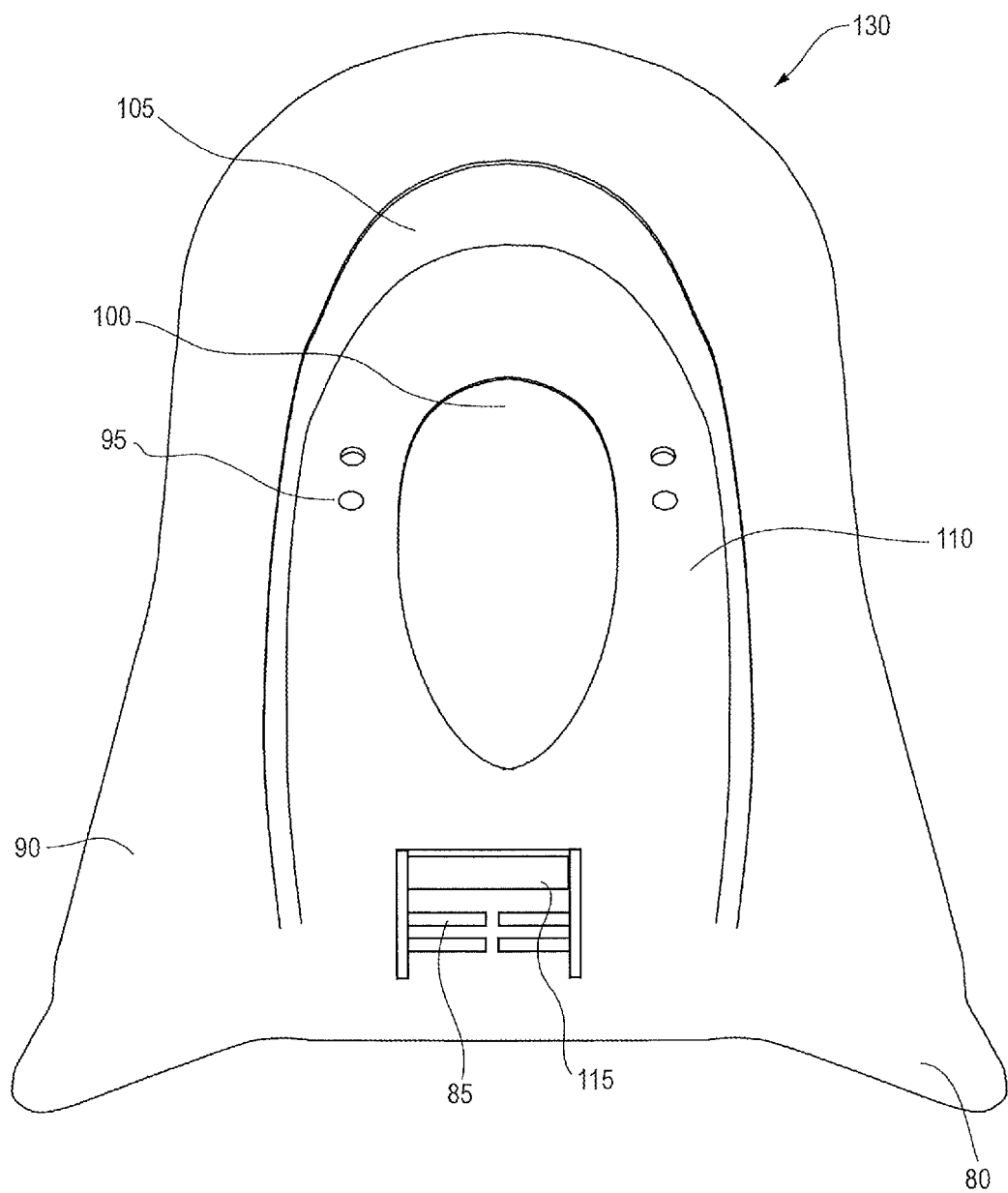
FIG. 3 is a front elevational view of a support frame of an embodiment of the present invention.
Figure 4:
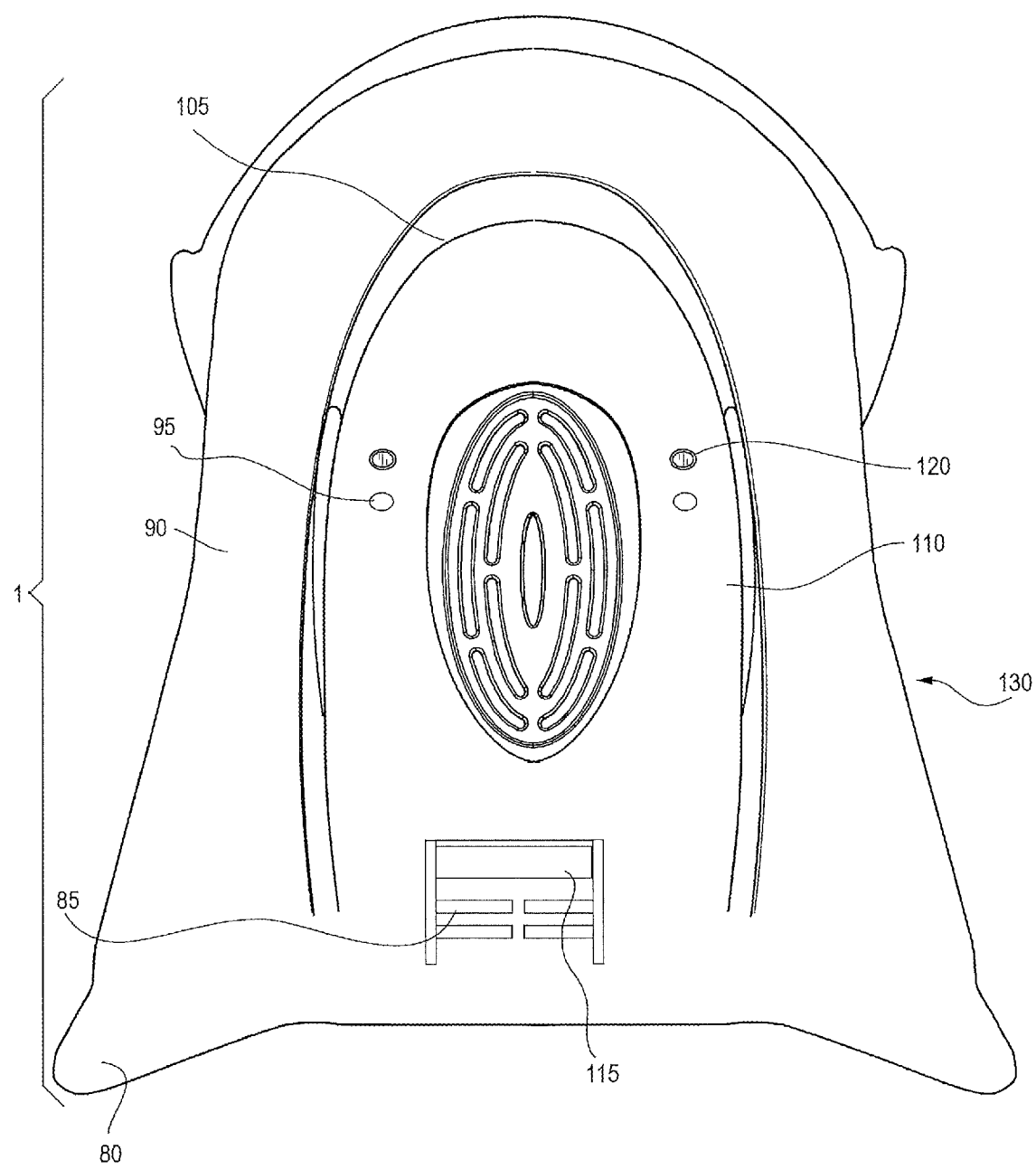
FIG. 4 is a rear elevational view of an embodiment of the present invention.

In certain embodiments, at least some of the ribs are notched to provide a further degree of flexibility to portions of the main body to locally assist bending or otherwise conforming better to the individual lower back shape of the user, vertically or laterally, while maintaining overall structure, rigidity and/or strength to the molded material in the various portions of the main body. For example, notches 75 in the lateral ribs associated with the upper support portion, act as a flexing point to improve a degree of flexibility in the lateral relief portions (FIG. 2). Notches 55 allow the support skirt to flex rearward to relieve pressure exerted by user contact and to improve conformation with the shape of the user's buttocks. Notches 140 allow rearward flex in the upper support portion to relieve pressure to the lumbar area of the spine and to improve conformation with the shape of the user's lumbar spine. Contouring in the lumbar area is primarily the result of bending of the upper support portion 30 about the notches 140. An alternate embodiment (See FIG. 18) includes a notch 55 extending across central support portion 15 and center relief portion 10 that allows the support skirt to flex rearward to relieve pressure exerted by user contact and to improve conformation with the shape of the user's buttocks. In this embodiment, notches 75 and/or 140 may be eliminated.

Figure 8:
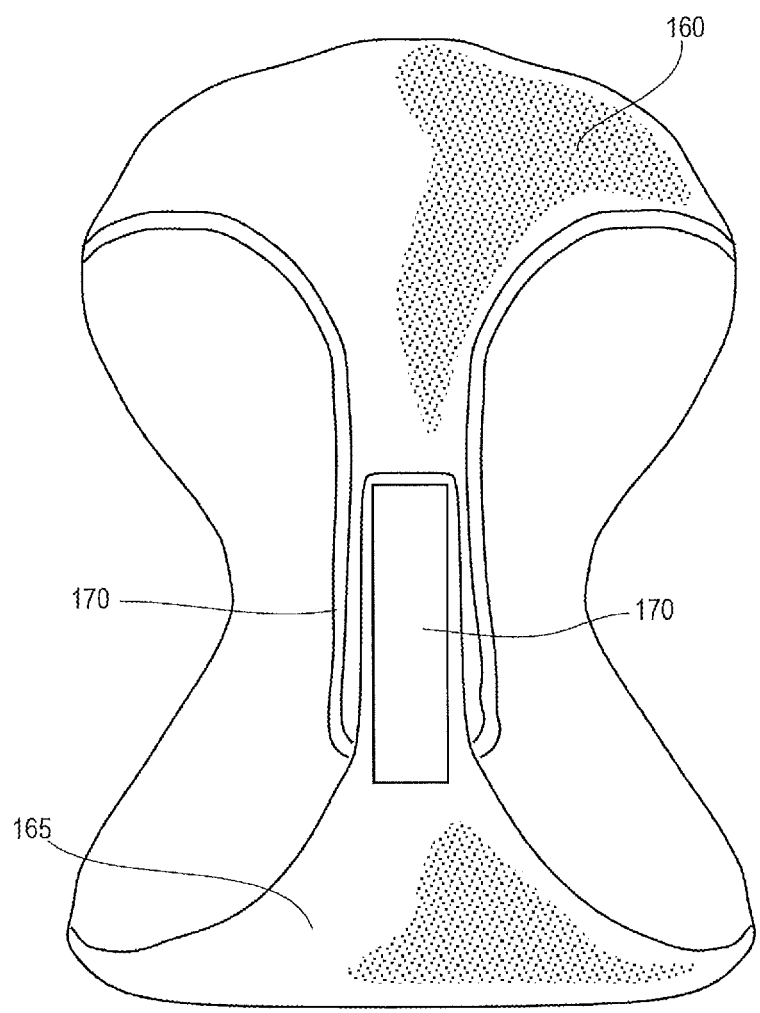
FIG. 8 is a view of an optional cover for covering the forward face of an embodiment of a device of the present invention.
Figure 9:
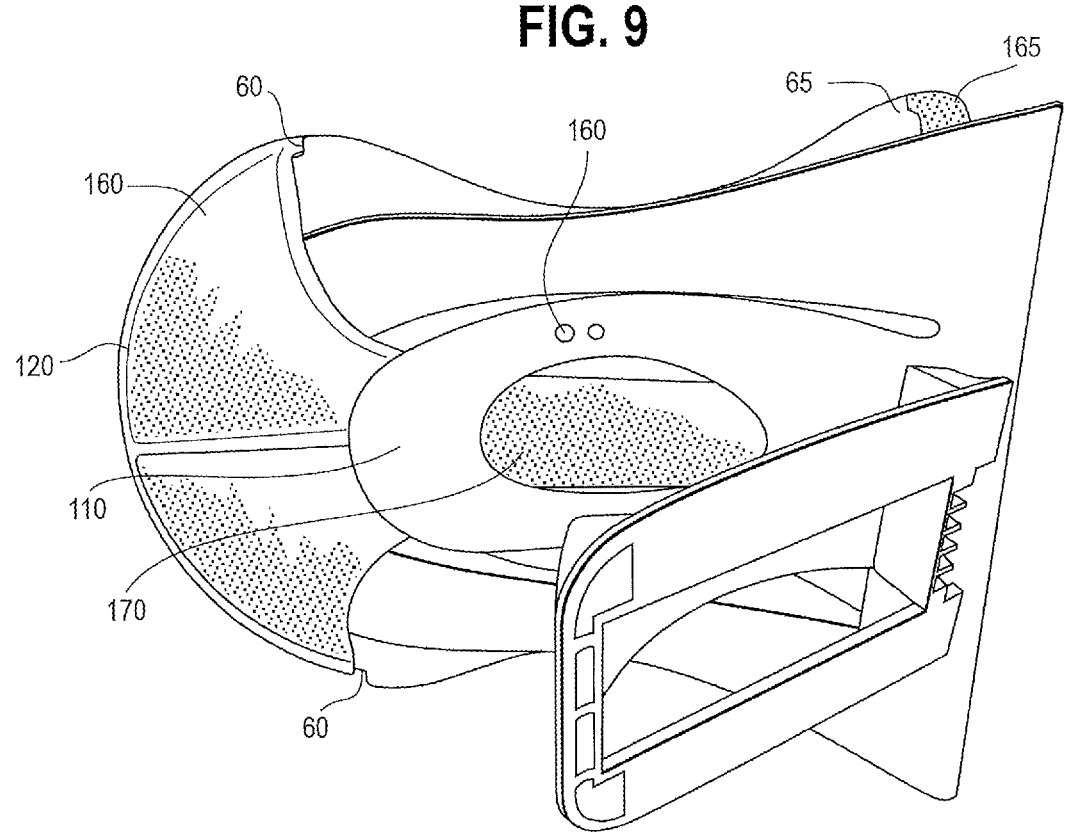
FIG. 9 is a rear perspective view of an embodiment of a device of the present invention having an optional cover and seat clip.
Figure 10:
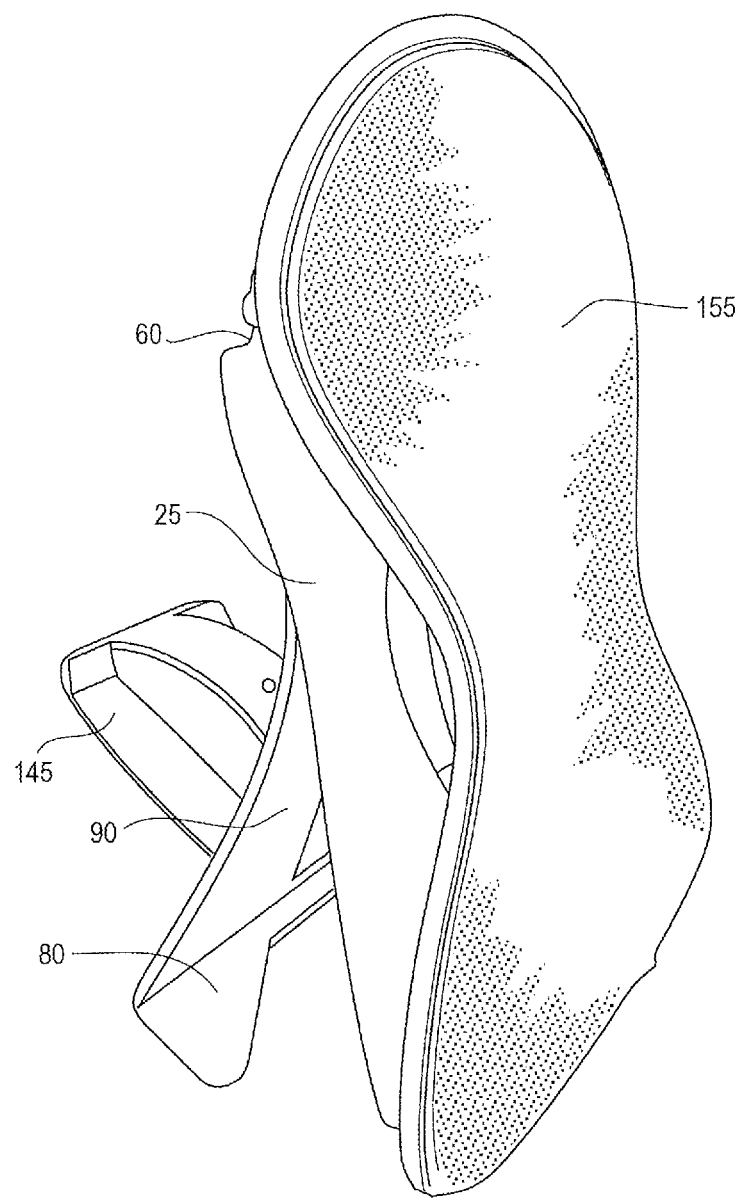
FIG. 10 is a front perspective view of an embodiment of a device of the present invention having an optional cover and optional seat clip.
Figure 11:
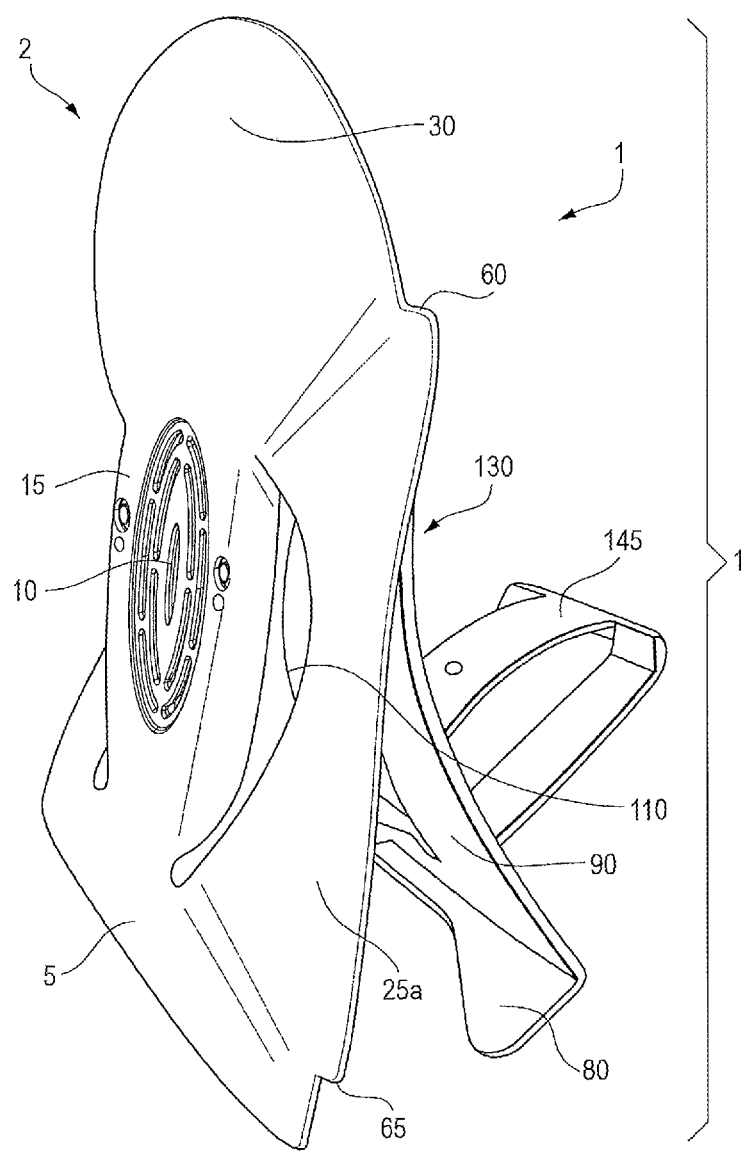
FIG. 11 is a front perspective view of an embodiment of a device of the present invention having an optional seat clip.
Figure 12:
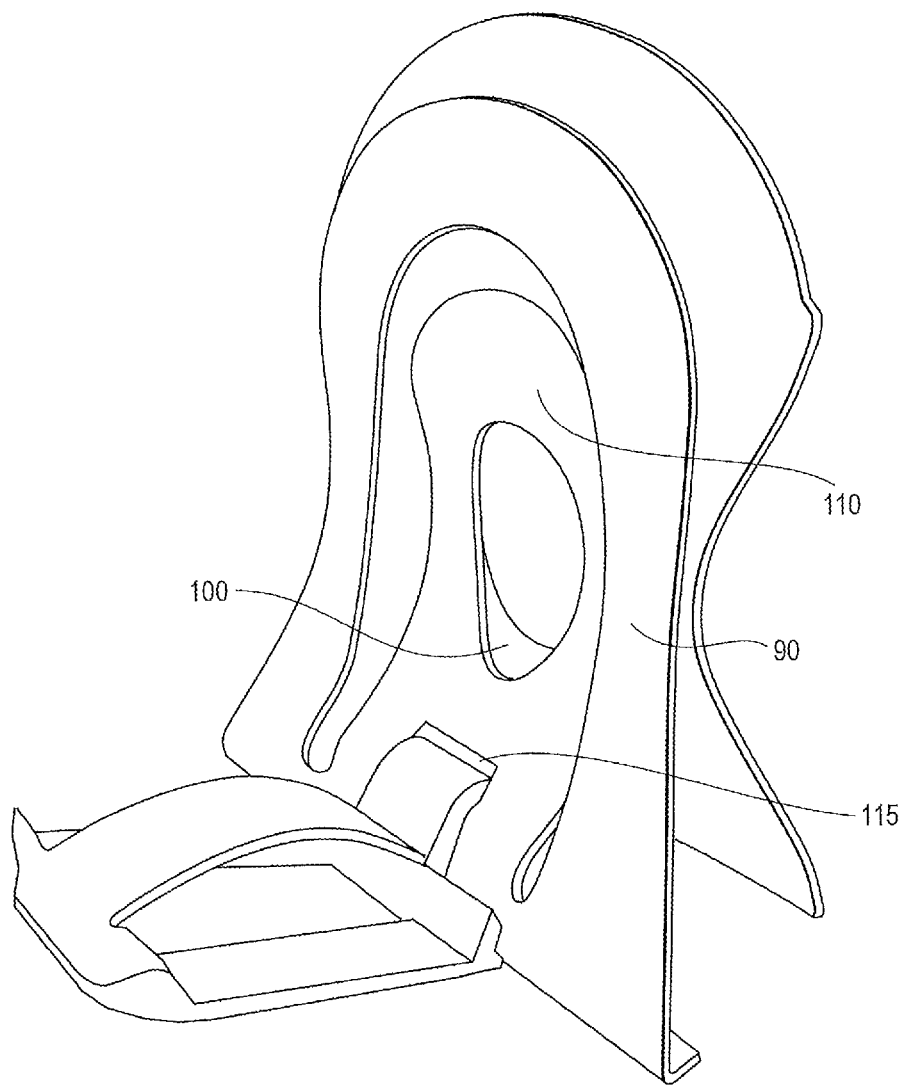
FIG. 12 is a rear perspective view of an embodiment of a device of the present invention having an optional seat clip.

The main body 2 also optionally includes a pair of notched shoulders 60 and a pair of notched shoulders 65. The positioning of the two pairs of notched shoulders create an upper and lower portion of the main body 2 that is slightly more narrow than the shoulders' widest points. An optional hourglass shaped cover 155, preferably padded or cushioned, having a lower pocket 160 and/or upper pocket 165 suitable for receiving a portion of the support skirt 5 and/or a portion of the upper support portion 30 may be fitted over the forward face of the device. Preferably, the lower and/or upper portion of the main body 2 that are each slightly more narrow than the skirt's or shoulders' widest points may be received into the lower and/or upper pocket of the cover, respectively, as described immediately hereinabove. The cover overlays at least a portion of at least one of the slotted center relief portion, center support portion, upper support portion and support skirt, preferably at least a portion of each of the slotted (or vented) center relief portion, center support portion, upper support portion and support skirt. If desired, the cover cushion may be held in place by adding elongated connectable tabs 170, preferably Velcro™ tabs, to each of the lower and upper pockets. See FIGS. 8, 9 and 10.

The main body may be prepared by an injection molded process employing a thermoplastic in the mold. The thermoplastic should have viscoelastic behavior. The type of thermoplastic is not critical so long as the thermoplastic has viscoelastic behavior. Exemplary plastics include nylon, polypropylene, acrylonitrile butadiene-styrene (ABS) and the like. The flex modulus as determined by the ASTM D790 or ISO 178 method is typically in the range of from about 1000 to about 3000, preferably from about 1200 to about 2500, and more preferably from about 1400 to about 2000, and all combinations and subcombinations of ranges thereof. Thermoplastic elastomers, such as polyester elastomers, are preferred materials for preparation of the main body.

Figure 5A:
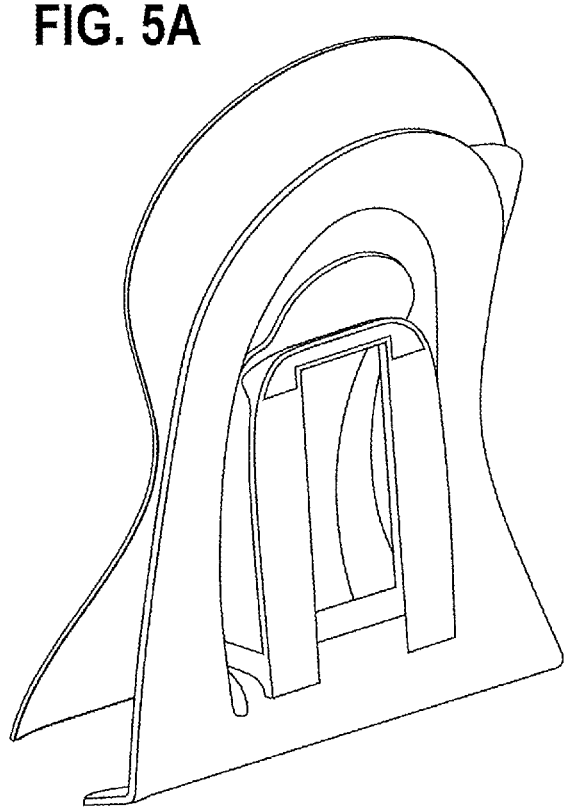
FIG. 5A is a rear perspective view of an embodiment of the present invention showing an optional seat clip in a stowed position.
Figure 5B:
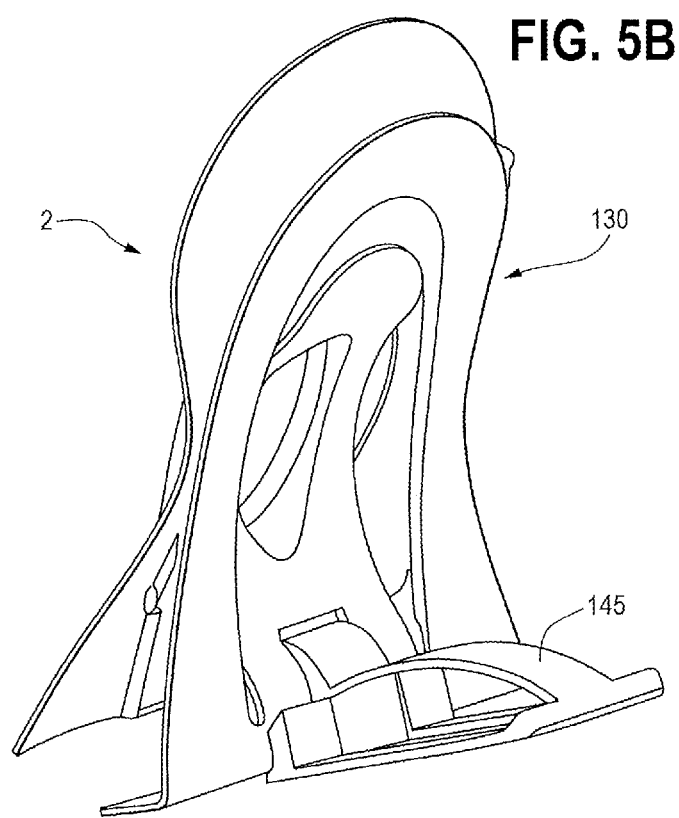
FIG. 5B is a rear perspective view of an embodiment of the present invention showing an optional seat clip in a seat-installed position.
Figure 22A:
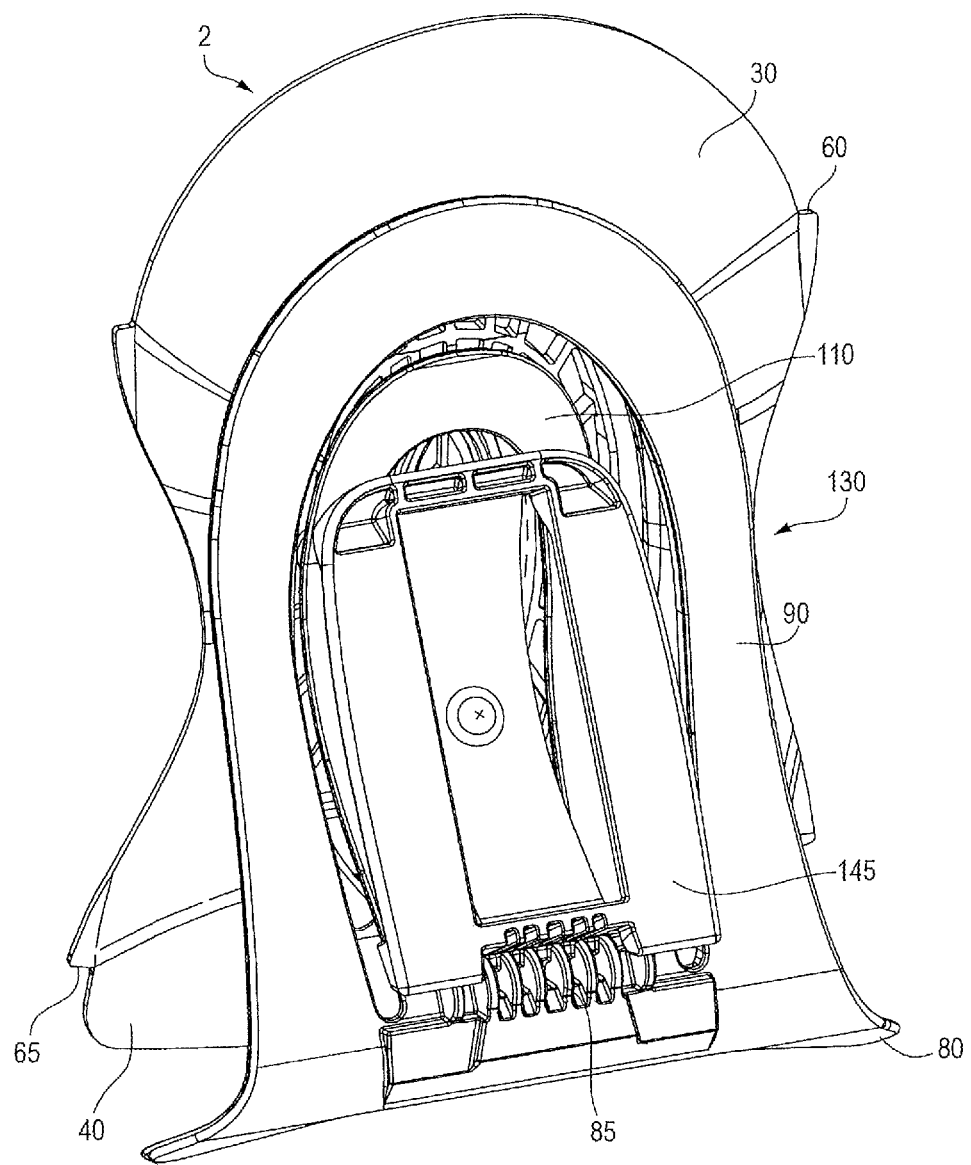
FIGS. 22A and 22B are rear perspective views of an embodiment showing an optional seat clip of the present invention in stowed and installed positions, respectively.
Figure 22B:
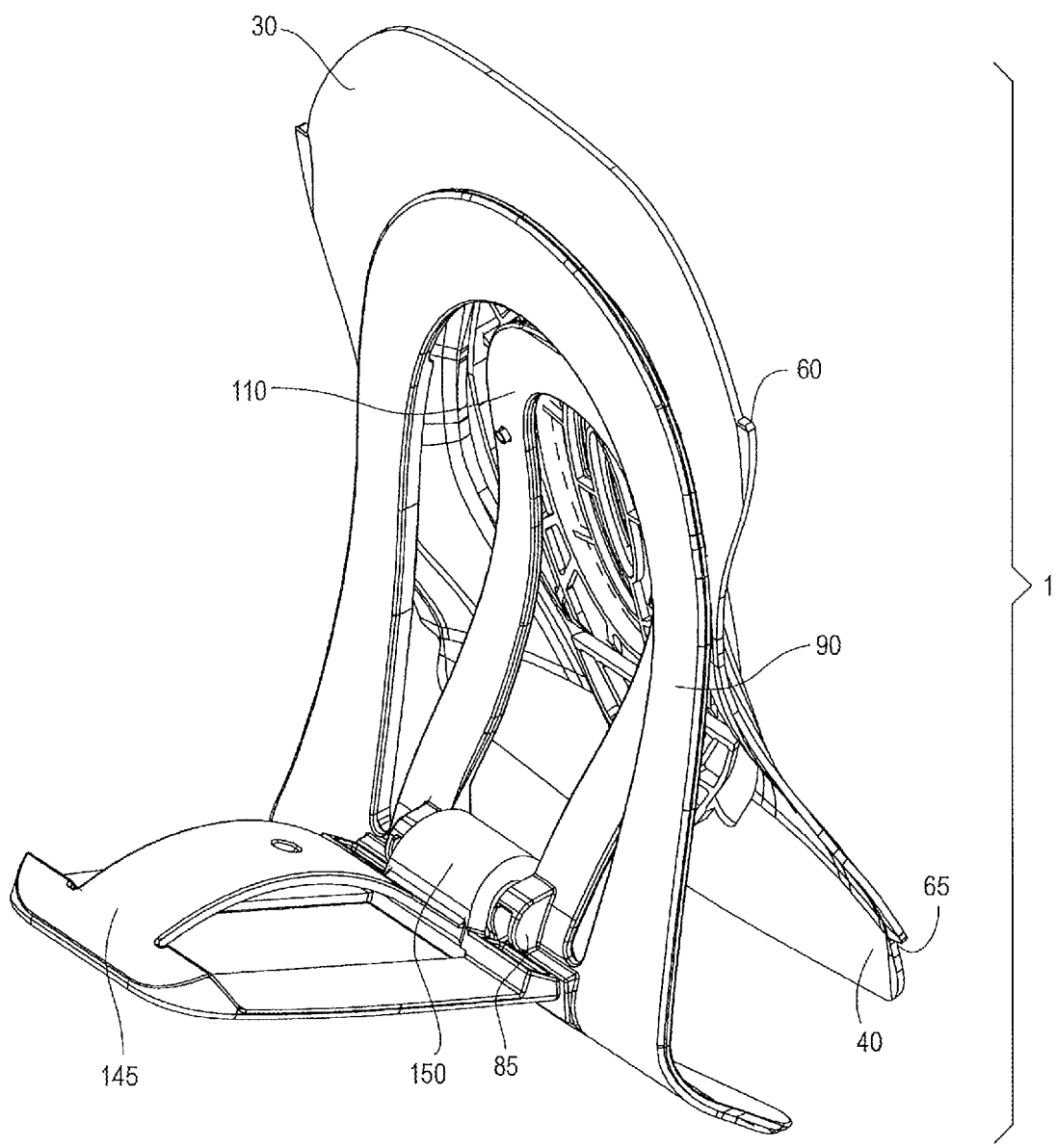
Figure 23:
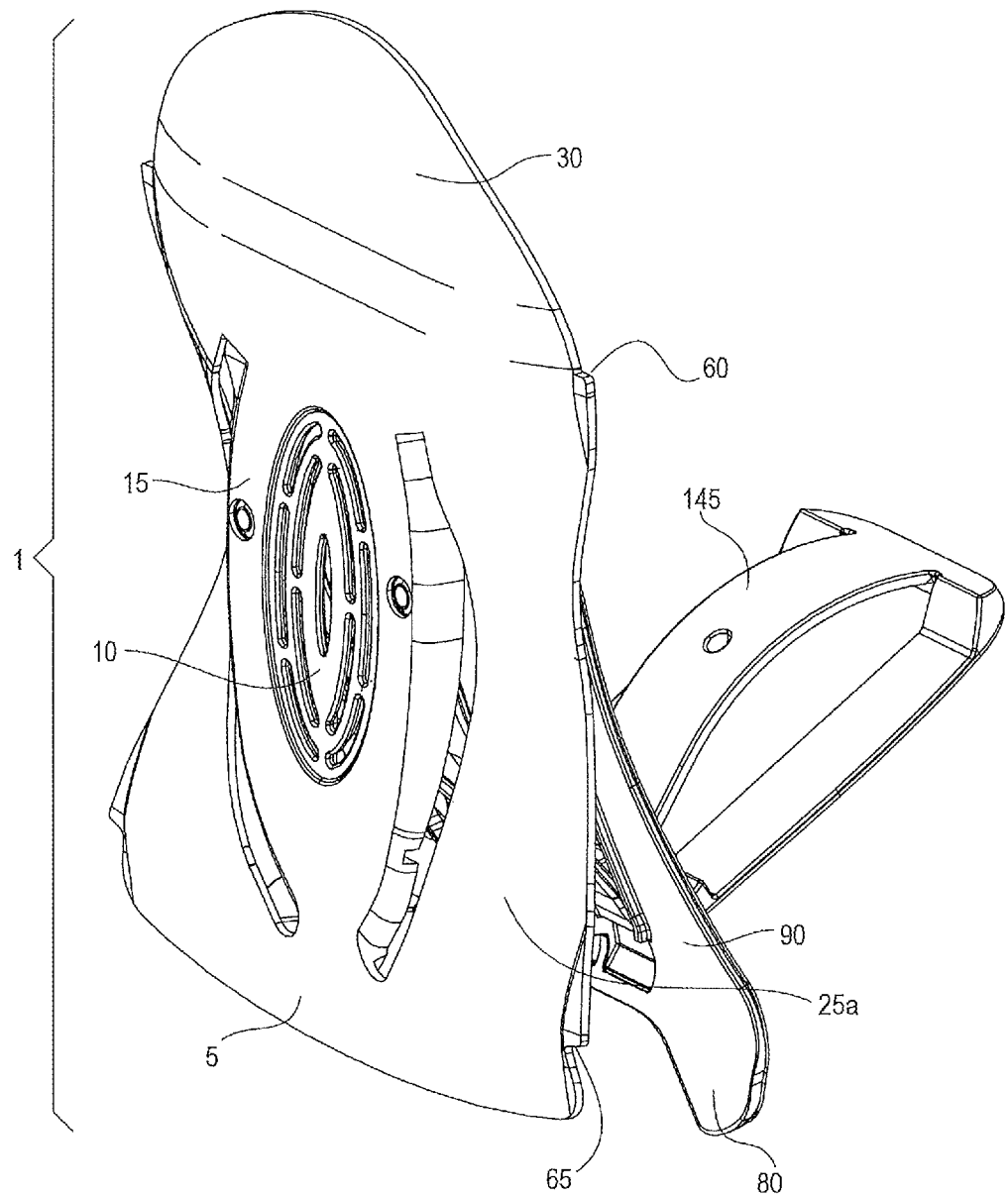
FIG. 23 is a front perspective view of an embodiment of the present invention showing an option seat clip.

The support frame 130 is attached to the rearward side of the main body 2. The support frame 130 includes an inner arch 110, an outer arch 90, and a pedestal 80 connected to both the inner and outer arches. The angle of connection of the pedestal 80 with the inner and outer arches is approximately 90 degrees. When the device is placed in position on a seat of interest to the user, the pedestal is designed to rest on the seat pan, preferably seat pan cushion, and assist in positioning and stabilizing the device against the seat surface. The outer arch 90, while curving forward, tilts inward (i.e., the upper portion of the outer arch is relatively closer in proximity to the seat back than the lower portion (portion in proximity to the pedestal) against the seat back and acts like a spring reacting against the relief arms 25. The outer arch 90, which curves forward from the pedestal 80 toward the relief arms, is designed when in use so that at least an upper portion of the outer arch rests against the seat back, preferably seat back cushion, and interacts with various support elements found therein. For example, interactions may occur between the seat back (or its cushion materials), its inner springs and seat back surface when the device is in use. The forward curvature creates resistance to the lateral relief arms of the main body, and further provides a sliding surface on which the relief arms may rock and/or flex laterally as the main body 2 adjusts to contact by the user's back. The inner arch 110, curves initially forward from the pedestal 80 to provide a flexible fulcrum from which the attached main body 2 may cantilever or rock. The inner arch provides for resistance against the center support portion of the main body, as well the connection between the main body 2 and the support frame. Its contact with the center relief portion permits a surface for bending and rolling contact with the inner arch when pressure is applied to the center support portion, directing the main body 2 rearward and upward. The bending of the inner arch causes a natural upward lift of the center support portion, helping to support the pelvis. The inner arch has means for attaching to the main body, such as orifices 95 through which typical fastening means can be utilized to attach the frame support to the main body. The inner arch 110 also defines a portal 100 that corresponds to the vented center relief portion 10, to create additional space for the slotted relief portion to flex rearward of the device and toward or onto the seat back. The outer arch 90, inner arch 110 and pedestal together define a generally horseshoe-shaped slot 105, which permits the inner and outer arches to independently flex to respond to and to the main body and resist deflections at the points in contact with the main body. In certain embodiments, the frame support also includes a retaining bracket (or seat clip) 145, which is hingeably attached to the frame support. The retaining bracket 145 is designed to insert between the seat back, preferably seat back cushion, and the seat pan, preferably seat pan cushion, to assist in stabilizing the device in use (FIGS. 5A, 5B, and 5C). Its hingable design permits the retaining bracket to swing upward and to be stowed in the recess defined by the rearward face of the inner arch when the device is not in use. In some embodiments, the retaining bracket is attached through slot 115 and mated with protrusion (or pivot) 85 in the inner arch employing hingable means such as a hook 150 and pivot 85 mechanism. This mechanism also permits the removal of the optional retaining bracket when it is not needed to stabilize the device in use. In alternate embodiments (See FIGS. 22A, 22B), the retaining bracket is mated with protrusion (or pivot) 85 in the inner arch employing hingable means such as a hook 150 and pivot 85 mechanism, which permits the removal of the optional retaining bracket when it is not needed to stabilize the device in use.

The support frame 130 may be prepared by an injection molded process employing a thermoplastic in the mold. The thermoplastic should have viscoelastic behavior. The type of thermoplastic is not critical so long as the thermoplastic has viscoelastic behavior. Exemplary plastics include nylon, polypropylene, acrylonitrile butadiene-styrene (ABS) and the like. The flex modulus as determined by the ASTM D790 or ISO 178 method is typically in the range of from about 1000 to about 3000, preferably from about 1200 to about 2500, and more preferably from about 1400 to about 2000, and all combinations and subcombinations of ranges thereof. Elastomers, such as polyester elastomers, are preferred materials for preparation of the support frame.

Figure 6:
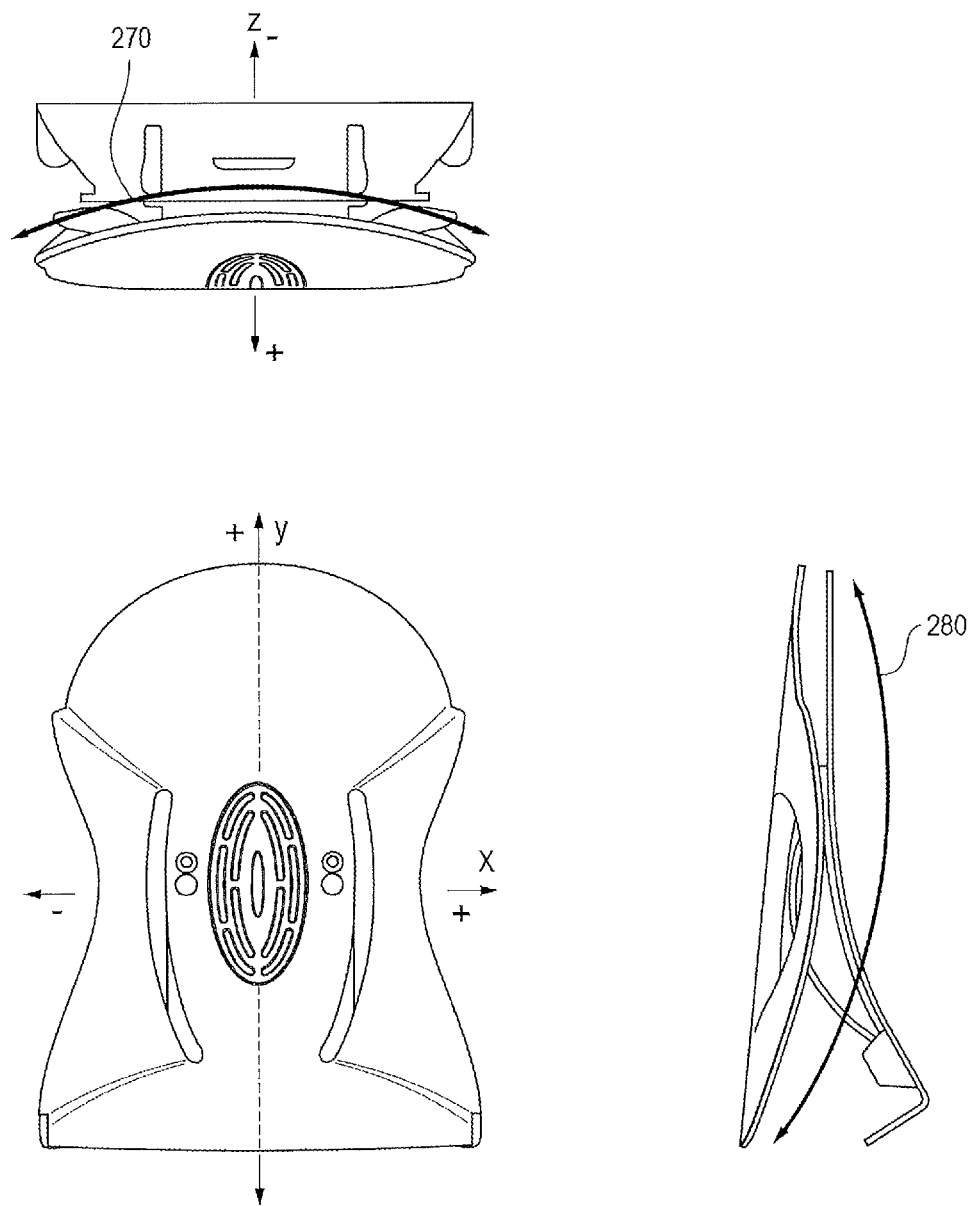
FIG. 6 is a view of orientation and direction definitions for embodiments of the present invention.

Embodiments of the device are designed to provide both X axis and/or Y axis bend or flex independently through the interaction of the main body 2 with the support frame 130 and contact in use with the seat back and seat pan (FIG. 6). One of the features of the device's structural properties in the Z direction is the providing of support for the spine. As described herein, the rearward surface of the main body 2 includes a series of ribs that are independently sized to support the spine and/or provide degrees of structural rigidity as required in use.

Figure 7:
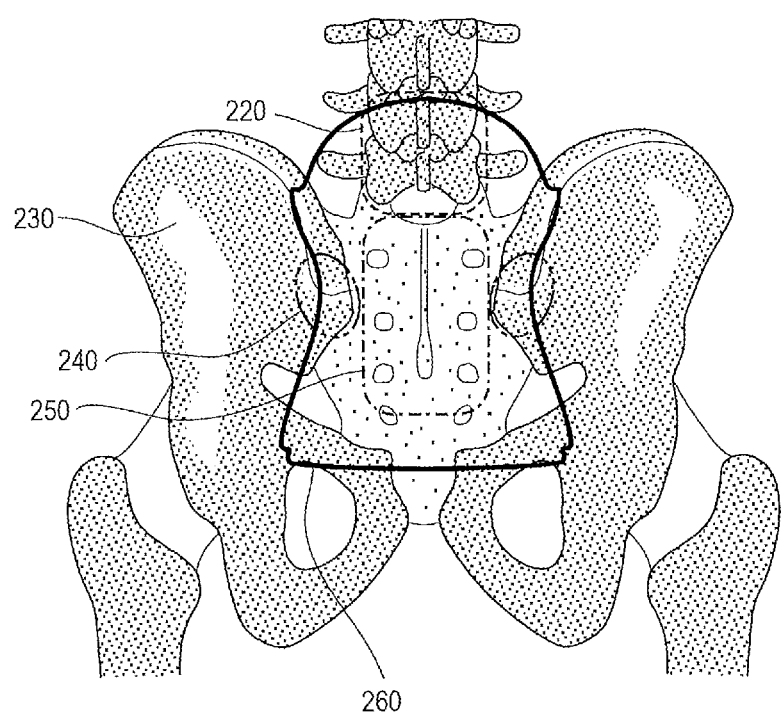
FIG. 7 depicts an outline overlay of an embodiment of the present invention onto the pelvis and spine of a seated occupant.

When correctly positioned on the seat, the surface portions of the main body 2 orient and conform themselves with regard to the sacrum, pelvis and spine of the seated occupant as shown in FIG. 7. For example, the upper support portion of the main body 2 generally associates with the L4 and L5 lumbar vertebrae 220, the center relief portion and center support portion associate with the sacral region 250, the relief arms curve rearwardly to relieve pressure associated from contact with the posterior superior iliac spine (PSIS) prominence 240 and/or assist in centering the right and left portions of the pelvis 230 with the device.

In use, the device provides a system of spring forces and flexible surfaces working in parallel or series to support and flex the main body 2 surfaces when pressure is applied by the user. For example, when a user's spine comes into contact with the device, user pressure against the main body 2 of the device 1 is offset by opposite forces arising from the inner arch 110, as it curves initially forward from the pedestal 80 to provide a flexible fulcrum from which the attached main body 2 may cantilever or rock. In doing so, the inner arch also provides resistance against the center support portion of the main body. This resistance and rigidity of the center support portion is sufficient to support the sacrum, but not so much as to pressure the nerves in the pelvic region. The inner arch's contact with the center relief portion permits a surface for rolling contact with the inner arch, when pressure is applied to the center support portion, directing the main body 2 inward and upward. In addition, the relief the outer arch 90, which curves rearward from the pedestal 80, is designed when in use so that at least an upper portion of the outer arch rests against the seat back and interacts with various support elements found therein. The curvature of the outer arch creates resistance to any flex of the relief arms in the Z direction as well as further providing a sliding surface on which the relief arms may rock about an axis parallel to the device's X-axis as the main body adjusts to contact by the user's back. As would be understood by the skilled artisan, the seat back support cushions and/or springs independently assist the support frame 130 in providing structured resistance to the device.

An alternate embodiment of the portable sacral support device of the present invention is generally shown in FIGS. 17-23. This embodiment contains many of the same elements disclosed hereinabove for portable sacral support devices (See also principally FIGS. 1-4, 11, and 12). In the alternate embodiment shown in FIG. 18, the rearward surface of the main body 2 comprises a series of ribs generally represented by a substantially oval latticework of intersecting ribs. The latticework spans the rearward surface of the main body from about curved slot 20 to about curved slot 20a, and its upper edge extends upward to a point located horizontally between the two upper notches for cushion 60. The latticework of ribbing extends downward to about a point between the lower ends of the two curved slots 20 and 20a. Certain of the ribs 50 are associated with the vented (or slotted) center relief portion, and some of the ribs 70 are associated with the center support portion. Other ribs 35 are associated with the support skirt 5. In this arrangement of rib latticework, ribs 75a (see FIG. 2) may be eliminated, which also allows removal of notches 75 and 140 from the latticework. The alternate embodiment replaces notches 55 (see FIG. 2) on the rearward side of main body 2 with a horizontal notch 55 (FIG. 18) spanning the center relief portion 10 and the center support portion 15 from slot 20 to curved slot 20a. The portal 100 of support frame 130 is extended downward to protrusion 85 such that slot 115 (see FIG. 3) may be eliminated in the alternative embodiment (FIG. 19).

Other embodiments of lower back and posture supporting devices of the present invention are capable of being integrated into common seating products. Accordingly, the present invention includes support devices capable of attachment and/or integration into a wide range of seating products, as well as the seats having the lower back and posture supporting devices integrated into the seat frames.

The lower back and posture support devices of the present invention can be modified, enabling it to be attached/integrated into these common types of seats. Given the advantages described herein regarding the superior comfort and support provided by the portable devices of the present invention, it appeared advantageous to further modify the devices allowing them to integrate into existing types of seating products to improve lower back comfort and relieve lower back pain.

Any type of seating product may be considered for integration with the devices of the present invention. Examples of such seats include but are not limited to automotive and/or light truck seating, heavy truck seating, bus and/or train seating, residential recliner seating, office seating, and airline cabin seating, and the like. Generally speaking, integrating the present inventive device into common seats should be feasible on any seating product that is typically constructed from an inner frame support structure and covered by cushion materials such as polyurethane foam and fabric.

A typical construction for common seating products includes a back support frame assembly surrounded by cushion materials and fabric. The back support frame is typically a weldment of steel or other common metal, or a wood frame. An array of metal wire or elastic springs often attaches to the support frame and supports the cushion material, or in other cases, the frame supports the cushion material directly.

The devices capable of integration into common seating types include a main body and support frame as disclosed herein. Means for attaching the support frame of the device to the wire springs or suspension in the back frame assembly integrate the devices into the seat. This means can include includes features allowing attachment to the wire springs or suspension in the back frame assembly. The support frames can be manufactured from any materials that provide the functionality as described herein and further enable attachment to the desired seat frames.

Figure 1:
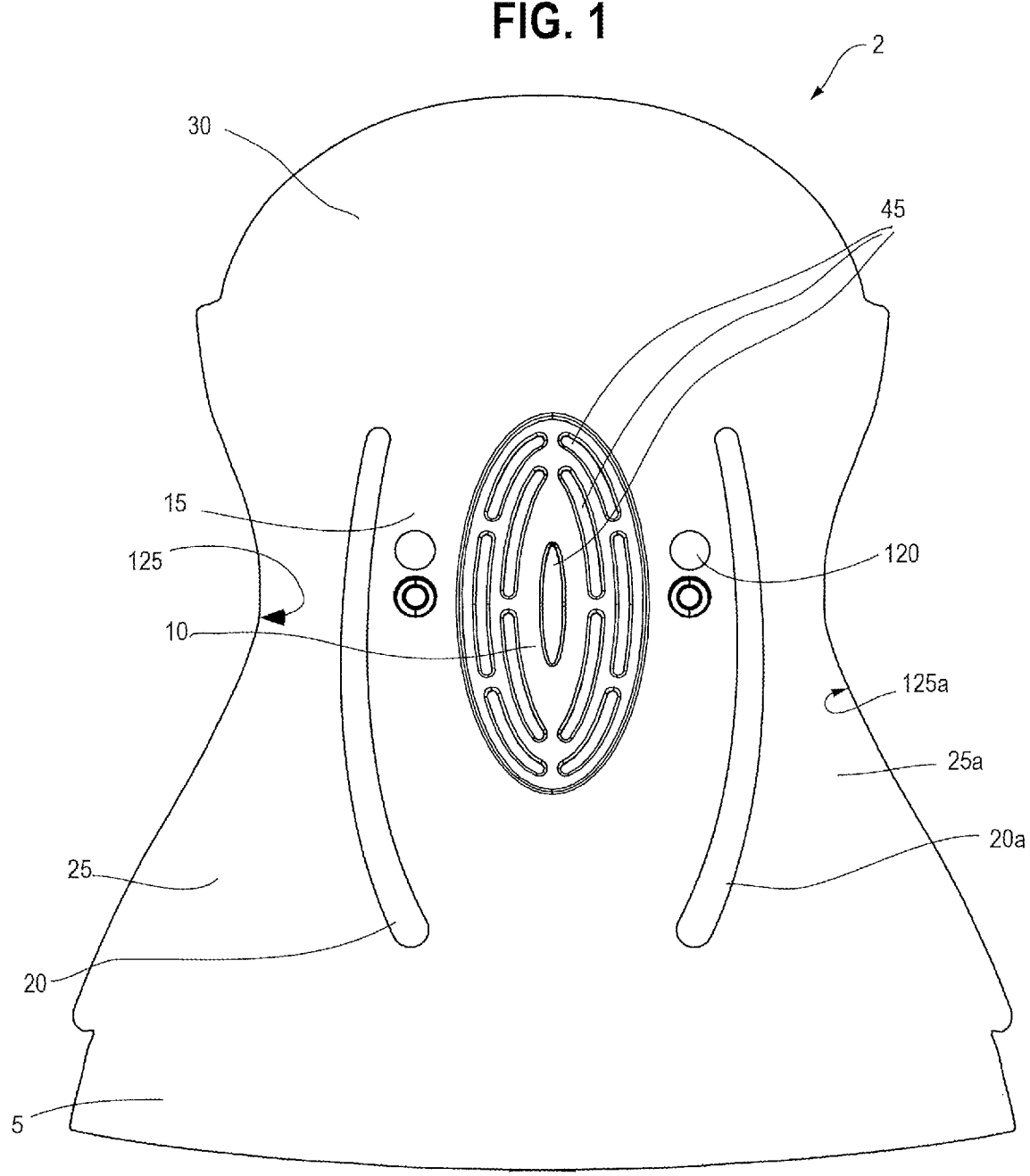
FIG. 1 is a front elevational view of an embodiment of the present invention.
Figure 13A:
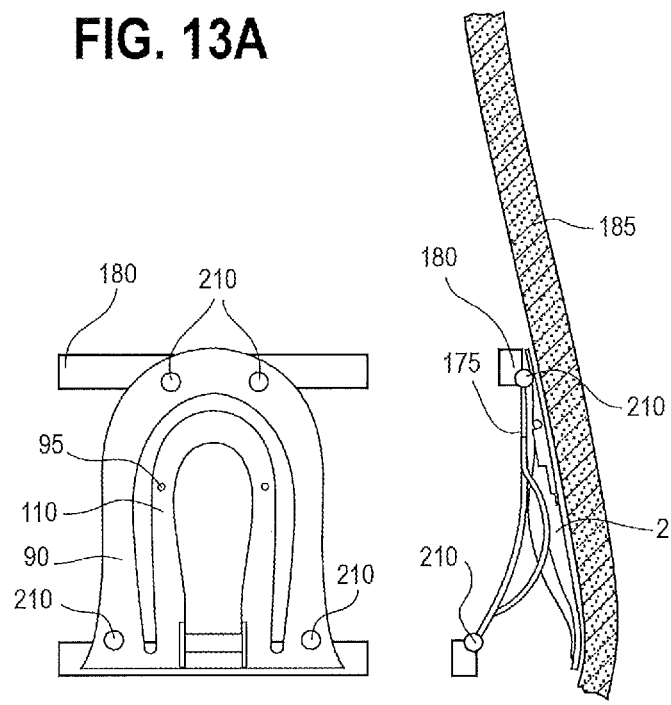
FIGS. 13A and 13B represent illustrations of an embodiment of an integrated lower back and posture support device of the present invention and its attachment to either a seat frame or back frame assembly springs or suspension.
Figure 13B:
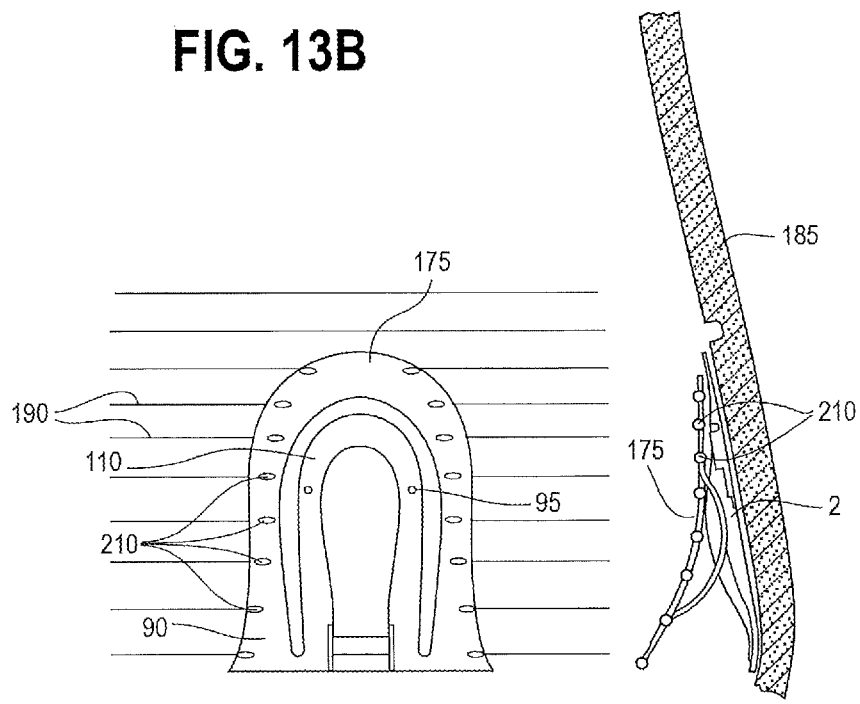
Figure 14:
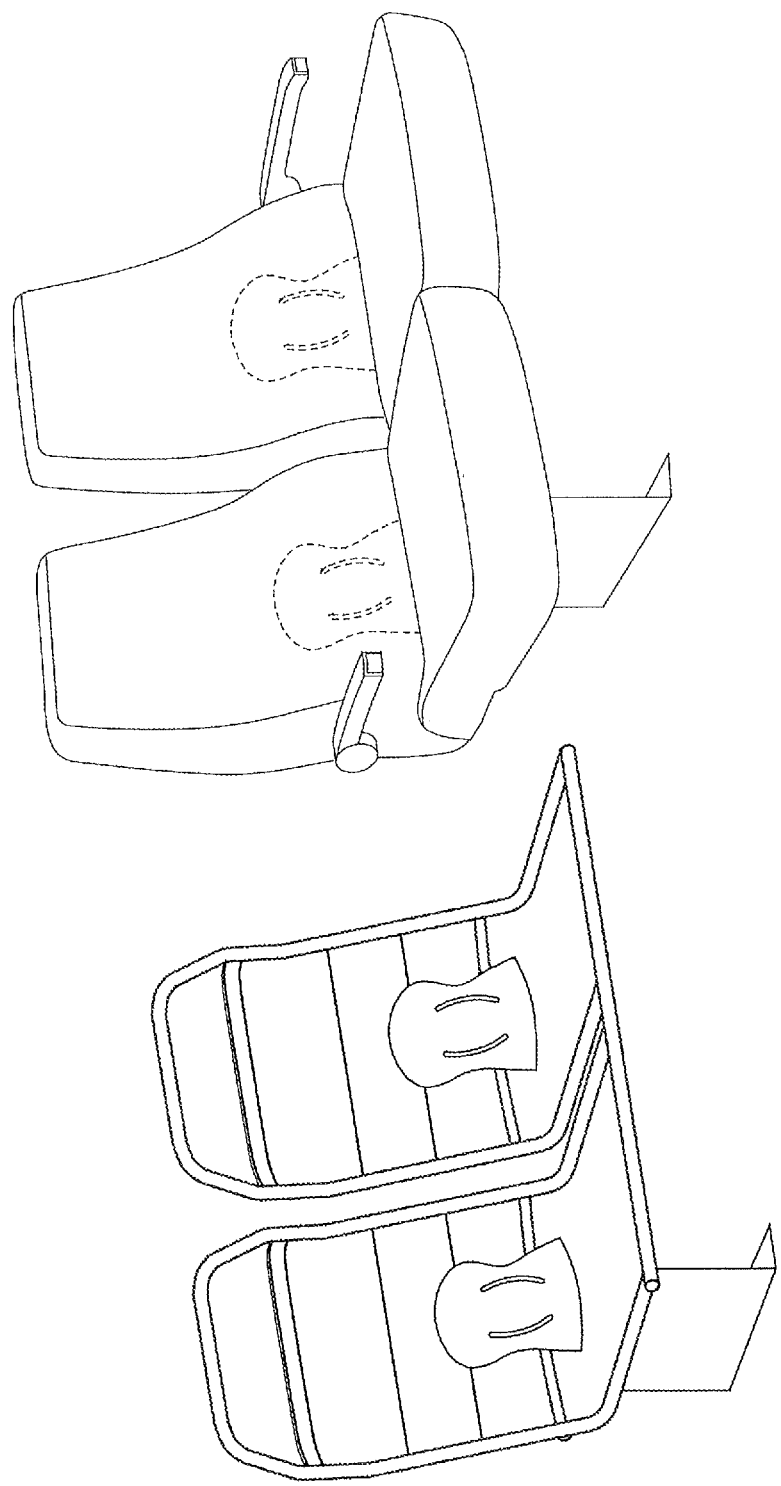
FIG. 14 illustrates an exemplary embodiment of the integrated device in a typical bus or train seat type.
Figure 15:
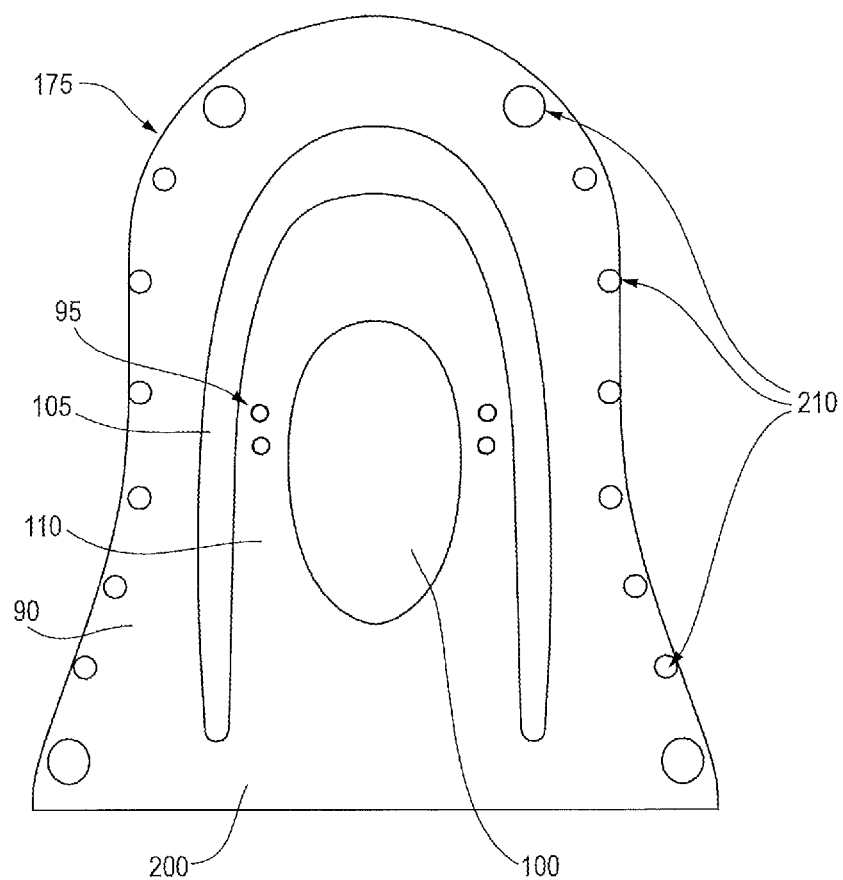
FIG. 15 illustrates a support frame exemplary embodiment for an integrated support device of the present invention.
Figure 16A:
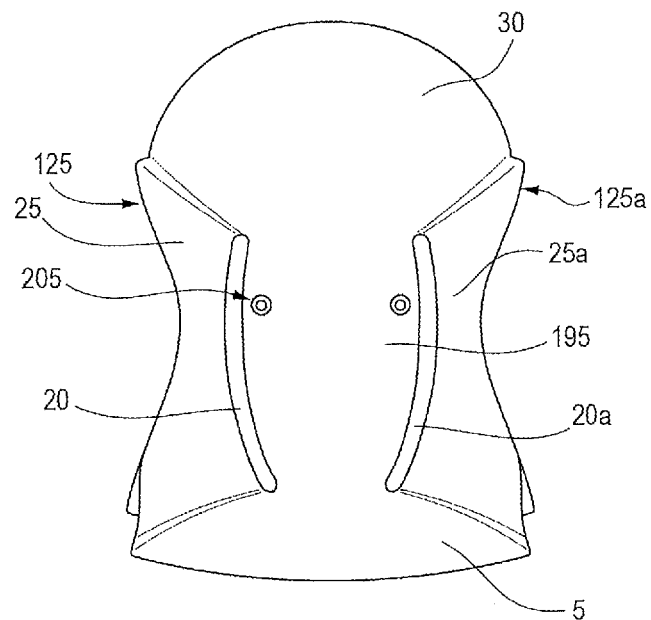
FIGS. 16A and 16B illustrate frontal and rear plan views of a main body portion of an integrated support device exemplary embodiment of the present invention.
Figure 16B:
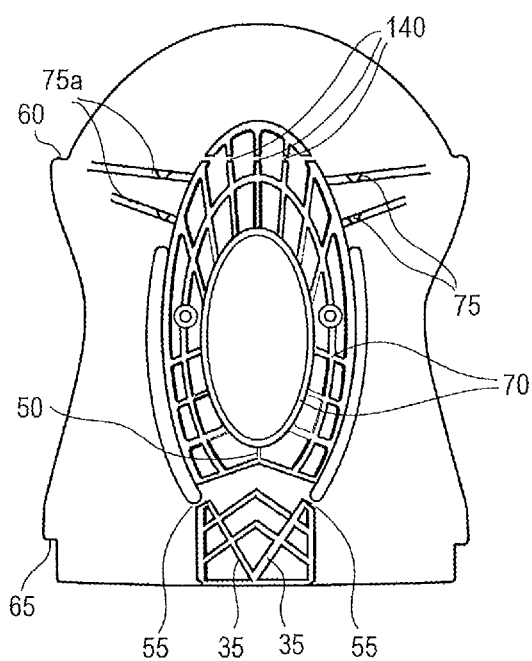
Figure 17:
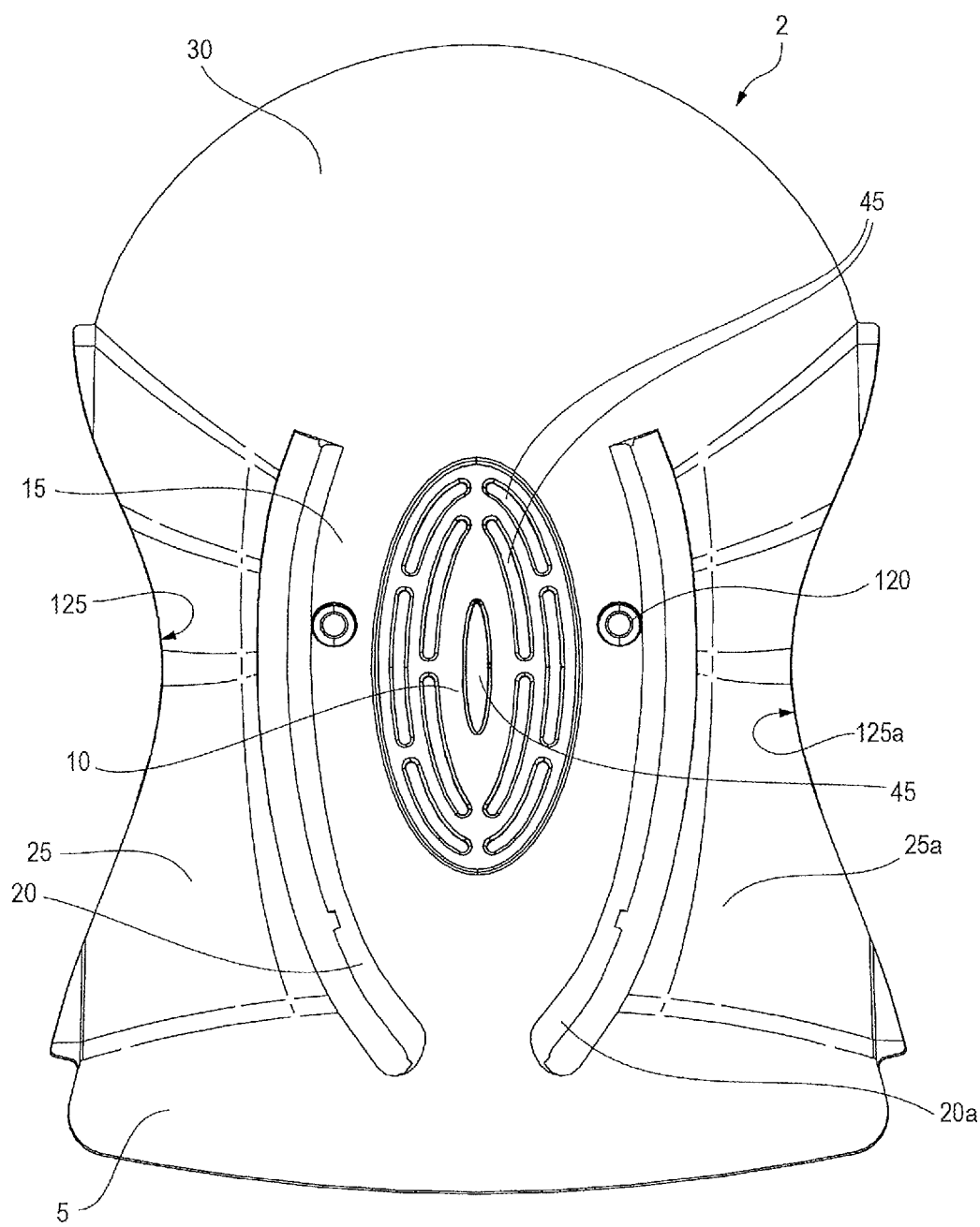
FIG. 17 is a front elevational view of a main body element of an embodiment of the present invention.

Embodiments of the integrated sacral support device of the present invention include a main body 2 and a support frame 130 attached to the main body 2. The main bodies in these embodiments have a center support portion 195, an upper support portion 30 connected to the center support portion 195, and a support skirt 5 connected to the center support portion. The main bodies may also include at least one of: (1) a vented center relief portion surrounded by and connected to the center support portion; and (2) relief arms disposed laterally to the center support portion and/or connected to the support skirt portion, preferably relief arms. The support frames attached to the main bodies in these embodiments comprise an outer arch and an inner arch medial to the outer arch. In such embodiments where the support device is integrated, a pedestal is not typically required, but rather, the inner and outer arches are conjoined at the base portion 200 of the support frame. Turning to the drawings, principally FIGS. 1-4, 11, 12, 13A, 13B, 14, 15, 16A, 16B, and 25, the main body 2 of the exemplary integrated support device 1, generally shown in FIGS. 13, 16A and 16B, includes a center support portion 195, left and right relief arms 25 and 25a, respectively, disposed laterally to the center support portion 195, an upper support portion 30 connected to the center support portion 195 and to the relief arms 25 and 25a, and a support skirt 5 connected to the center support portion 195 and to the relief arms 25 and 25a. It is preferred that the support device 1 be a molded product that is formed through one of a number of conventional molding techniques. The outer edge (125, 125a) of each relief arm (25, 25a) is laterally curved toward the midpoint of the center relief portion 10 such that the width of the main body 2 as defined by each relief arm outer edge's inner most point (the waist) is more narrow than the width of the main body's upper support portion 30 and/or its skirt 5. Each relief arm (25, 25a) forms an arc rearwardly curving between its connections to the main body's upper support portion 30 and skirt 5. The center support portion 195, upper support portion 30, skirt 5 and left relief arm 25 together define a curved slot 20 in the main body. Similarly, the center support portion 195, upper support portion 30, skirt 5 and right relief arm 25a together define a curved slot 20a in the main body 2 that mirrors slot 20 about the main body's y-axis. The center support portion 195 is substantially flat and acts to support the user's sacrum as well as provide the means for connecting the main body 2 with the support frame. The center support portion deflects rearward against the inner arch when pressure is applied from the user. The center support portion when viewed in conjunction with its rearward surface's ribs, is thicker so that the center support portion resists bending and remains flat. The laterally disposed relief arms deflect forward against the outer arch when pressure is applied to the center support portion from the user. The shape of the laterally disposed relief arms work to provide relief around the user's posterior-superior-iliac-spine (PSIS) prominence, at least in part by the narrow waist of the main body and/or the rearwardly curved arc. The upper support portion surface reacts and flexes against the user's lower lumbar vertebrae, conforming to the user's back regions at, proximate and/or adjacent to the lumbar vertebrae, generally L4 and/or L5, to relieve and or redistribute pressure, while the support skirt reacts and flexes against the user's buttocks, conforming to the user's buttocks shape. The main body 2 also includes means, preferably rivets 120 for attaching the main body 2 to the support frame 130. The means for attaching the main body 2 to the support frame 130 is not critical so long as it is strong enough to maintain the attachment and does not otherwise interfere with the function of the device or its comfort to the user. Exemplary means include rivets, which may be made of metal, preferably steel, and may be constructed of carbon steel or the like for ease of manufacturing and/or the minimization of overall manufacturing costs. Exemplary connecting orifices are shown in FIGS. 1 and 16A thorough which attaching means are employed to attach the main body to exemplary corresponding orifices 95 in the seat support frame.

The rearward surface (shown in FIG. 2) of the main body 2 comprises a series of ribs. Certain of the ribs 50 and/or 70 are associated with the center support portion. In the integrated device, the center support portion encompasses the space occupied by both the vented center relief portion and center support portion shown for any one of the exemplary portable devices illustrated in other figures herein. Other ribs 35 and 75a, respectively, are associated with the support skirt 5 or with the upper support portion 30. In an alternate embodiment, the rearward surface (shown in FIG. 18) of the main body 2 comprises a series of ribs, wherein certain of the ribs 50 are associated with the vented (or slotted) center relief portion, and some of the ribs 70 are associated with the center support portion. Other ribs 35 are associated with the support skirt 5. In either embodiment, the ribs, at least in part at least in part as a function of their size and/or quantity, independently provide structure, rigidity and/or stiffness to the molded material in the various portions of the main body.

In certain embodiments, at least some of the ribs are notched to provide a further degree of flexibility to portions of the main body to locally assist bending or otherwise conforming better to the individual lower back shape of the user, vertically or laterally, while maintaining overall structure, rigidity and/or strength to the molded material in the various portions of the main body. For example, notches 75 in the lateral ribs associated with the upper support portion, act as a flexing point to improve a degree of flexibility in the lateral relief portions. Notches 55 allow the support skirt to flex rearward to relieve pressure exerted by user contact and to improve conformation with the shape of the user's buttocks. Notches 140 allow rearward flex in the upper support portion to relieve pressure to the lumbar area of the spine and to improve conformation with the shape of the user's lumbar spine. Contouring in the lumbar area is primarily the result of bending of the upper support portion 30 about the notches 140. An alternate embodiment (See FIG. 18) includes a notch 55 extending across central support portion 15 and center relief portion 10 that allows the support skirt to flex rearward to relieve pressure exerted by user contact and to improve conformation with the shape of the user's buttocks. In this embodiment, notches 75 and/or 140 may be eliminated. The main body 2 also optionally includes a pair of notched shoulders 60 and a pair of notched shoulders 65. The positioning of the two pairs of notched shoulders create an upper and lower portion of the main body 2 that is slightly more narrow than the shoulders' widest points.

The main body may be prepared by an injection molded process employing a thermoplastic in the mold. The thermoplastic should have viscoelastic behavior. The type of thermoplastic is not critical so long as the thermoplastic has viscoelastic behavior. Exemplary plastics include nylon, polypropylene, acrylonitrile butadiene-styrene (ABS) and the like. The flex modulus as determined by the ASTM D790 or ISO 178 method is typically in the range of from about 1000 to about 3000, preferably from about 1200 to about 2500, and more preferably from about 1400 to about 2000, and all combinations and subcombinations of ranges thereof. Thermoplastic elastomers, such as polyester elastomers, are preferred materials for preparation of the main body.

Figure 25:
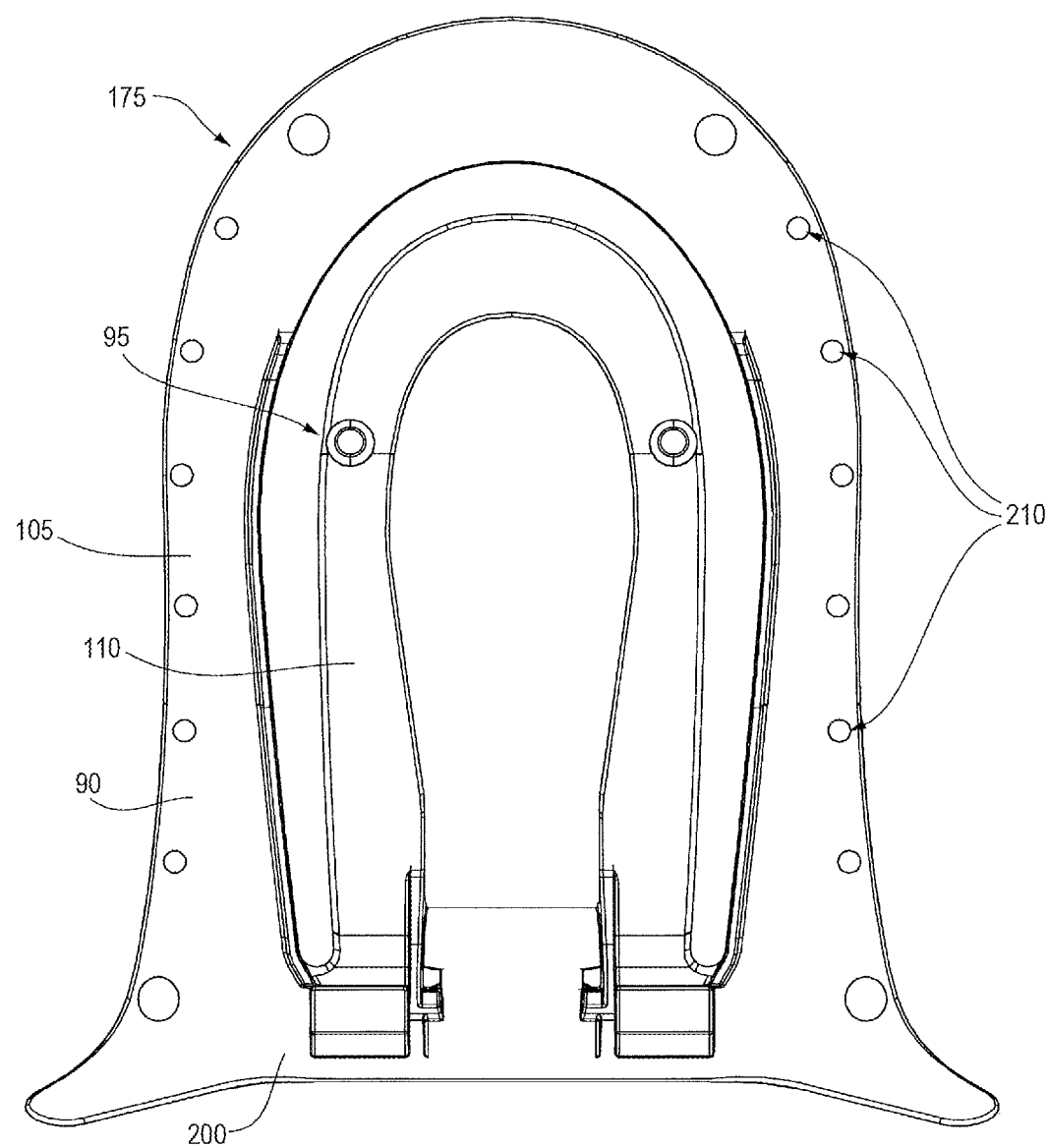
FIG. 25 illustrates a support frame exemplary embodiment for an integrated support device of the present invention.

The support frame 175 is attached to the rearward side of the main body 2. The support frame 175 includes an outer arch 90 and an inner arch 110 medial to the outer arch 90, conjoined at the support frame base portion 200. See principally FIGS. 1-4, 11, 12, 13A, 13B, 15, 21, 16A and 16B. When the device is integrated with a seat frame of interest to the user, the device's support frame 175 is designed to attach to or otherwise be adjoined to the seat's support frame 180, the latter, in some embodiments, preferably constructed of wood or steel (FIG. 13A), its springs 190 (FIG. 13B), preferably wire or elastic, suspension and/or other support elements, and assist in positioning and stabilizing the device against the seat frame while maintaining the herein described movements of the main body and support frame 175 in relation to one another. As one would immediately recognize once armed with the present disclosure, the nature, shape and characteristics of support frame 175 depend to some extent on the seat, and seatback frame, of the seat in which the support device is intended to be integrated and manner in which the support frame is to be attached or otherwise adjoined. The support frame of the device is constructed to be attached to a seat support frame (for example, as in FIG. 13A), springs and/or suspension (for example, as in FIG. 13B), or be constructed for more universal mounting to either frame or springs/suspension. An additional embodiment of the device support frame is illustrated in FIG. 25 having attachment points that allow the device to be affixed to either a seat frame or seatback springs and or suspension.

Alternatively, the support frame 175 may be molded into the seat back frame to form a single continuous seat back support structure to which the main body may be attached or otherwise adjoined in some embodiments. The continuous support structure may comprise one or more materials of differing composition, so that the strength, flexibility and other physical properties required by the various portions of the support structure including the integrated support device are not adversely impacted, and so maintain each aspect of the support structure's physical properties necessary for its intended function. Similarly to the portable device, the outer arch 90, while curving forward, tilts inward (i.e., the upper portion of the outer arch is relatively closer in proximity to the seat back than the lower portion (portion in proximity to support frame base portion 200, where the two arches are conjoined) against the seat back and acts like a spring reacting against the relief arms (25, 25a). The outer arch 90, which curves forward from the conjoining base portion 200 of the support frame toward the relief arms, is designed when in use so that at least an upper portion of the outer arch rests against the seat frame, and interacts with various support elements found therein. For example, interactions may occur between the seat back (or its cushion materials 185), its inner springs and seat back surface when the device is in use. The forward curvature creates resistance to the lateral relief arms (25, 25*a*) of the main body 2, and further provides a sliding surface on which the relief arms may rock and/or flex laterally as the main body 2 adjusts to contact by the user's back. The inner arch 110, curves initially forward from the conjoining base portion 200 of the support frame to provide a flexible fulcrum from which the attached main body 2 may cantilever or rock. The inner arch provides for resistance against the center support portion 195 of the main body, as well the connection between the main body 2 and the support frame 175. The support frame's contact with the center relief portion permits a surface for bending and rolling contact with the inner arch when pressure is applied to the center support portion, directing the main body 2 rearward and upward. The bending of the inner arch 110 causes a natural upward lift of the center support portion, helping to support the pelvis. The inner arch has means for attaching to the main body, such as exemplary orifices 95 through which typical fastening means can be utilized to attach the frame support to the main body through its exemplary corresponding orifices 205. The inner arch 110 also defines a portal 100 that corresponds to the vented center relief portion 10 or enlarged center support portion 15 (when vented center relief portion is absent), to create additional space for the slotted relief portion or center support portion, respectively, to flex rearward of the device and toward or onto the seat back. The outer arch 90, inner arch 110 and support frame base portion 200 together define a generally horseshoe-shaped slot 105, which permits the inner and outer arches to independently flex to respond to and to the main body and resist deflections at the points in contact with the main body.

The support frame 175 may be prepared by an injection molded process employing a thermoplastic in the mold. The thermoplastic should have viscoelastic behavior. The type of thermoplastic is not critical so long as the thermoplastic has viscoelastic behavior. Exemplary plastics include nylon, polypropylene, acrylonitrile butadiene-styrene (ABS) and the like. The flex modulus as determined by the ASTM D790 or ISO 178 method is typically in the range of from about 1000 to about 3000, preferably from about 1200 to about 2500, and more preferably from about 1400 to about 2000, and all combinations and subcombinations of ranges thereof. Elastomers, such as polyester elastomers, are preferred materials for preparation of the support frame.

The device is designed to provide both X axis and/or Y axis bend or flex independently through the interaction of the main body 2 with the support frame 130 and contact in use with the seat back and seat pan (FIG. 6). One of the features of the device's structural properties in the Z direction is the providing of support for the spine. As described herein, the rearward surface of the main body 2 includes a series of ribs that are independently sized to support the spine and/or provide degrees of structural rigidity as required in use.

When correctly positioned on the seat, the surface portions of the main body 2 orient and conform themselves with regard to the sacrum, pelvis and spine of the seated occupant as shown in FIG. 7. For example, the upper support portion of the main body 2 generally associates with the L4 and L5 lumbar vertebrae, the center relief portion and center support portion associate with the sacral region, the relief arms curve rearwardly to relieve pressure associated from contact with the posterior superior iliac spine (PSIS) prominence and/or assist in centering the right and left portions of the pelvis with the device.

In use, the device provides a system of spring forces and flexible surfaces working in parallel or series to support and flex the main body 2 surfaces when pressure is applied by the user. For example, when a user's spine comes into contact with the device, user pressure against the main body 2 of the device 1 is offset by opposite forces arising from the inner arch 110, as it curves initially forward from the base portion of the support frame 200 to provide a flexible fulcrum from which the attached main body 2 may cantilever or rock. In doing so, the inner arch also provides resistance against the center support portion of the main body. This resistance and rigidity of the center support portion is sufficient to support the sacrum, but not so much as to pressure the nerves in the pelvic region. The inner arch's contact with the center relief portion or enlarged center support portion permits a surface for rolling contact with the inner arch, when pressure is applied to the center support portion, directing the main body 2 inward and upward. In addition, the relief in the outer arch 90, which curves rearward from the conjoining base portion of the support frame 200, is designed when in use so that at least an upper portion of the outer arch rests against the seat back and interacts with various support elements found therein. The curvature of the outer arch creates resistance to any flex of the relief arms in the Z direction as well as further providing a sliding surface on which the relief arms may rock about an axis parallel to the device's X-axis as the main body adjusts to contact by the user's back. As would be understood by the skilled artisan, the seat back support cushions and/or springs independently assist the support frame 175 in providing structured resistance to the device.

An alternate embodiment of the integrated sacral support device of the present invention is generally shown in FIGS. 17-25. This embodiment contains many of the same elements disclosed hereinabove for portable sacral support devices (See also principally FIGS. 1-4, 11, 12, and 17-20). In the alternate embodiment shown in FIG. 18, the rearward surface of the main body 2 comprises a series of ribs generally represented by an oval latticework of intersecting ribs. The latticework spans the rearward surface of the main body from about curved slot 20 to about curved slot 20*a*, and its upper edge extends upward to a point located horizontally between the two upper notches for cushion 60. The latticework of ribbing extends downward to about a point between the lower ends of the two curved slots 20 and 20*a*. Certain of the ribs 50 are associated with the vented (or slotted) center relief portion, and some of the ribs 70 are associated with the center support portion. Other ribs 35 are associated with the support skirt 5. In this arrangement of rib latticework, ribs 75*a* may be eliminated, which also allows removal of notches 75 and 140 from the latticework. The alternate embodiment replaces notches 55 on the rearward side of main body 2 with a horizontal notch 55 (FIG. 18) spanning the center relief portion 10 and the center support portion 15 from slot 20 to curved slot 20*a*. The portal 100 of support frame 130 is extended downward to protrusion 85 such that slot 115 may be eliminated (FIG. 25).

Once armed with the disclosures provided herein, the skilled artisan will be able to appreciate and employ to great advantage the many teachings of the present invention, including those directed to lower back and posture support, particularly as it relates to improvement in seating comfort and/or seat design.

The disclosures of each of the foregoing documents are hereby incorporated herein by reference, in their entireties.

The invention illustratively disclosed herein suitably may be practiced in the absence of any element which is not specifically disclosed herein. The invention illustratively disclosed herein suitably may also be practiced in the absence of any element which is not specifically disclosed herein and that does not materially affect the basic and novel characteristics of the claimed invention.

While the present invention has been described in connection with what are presently considered to be the most practical and preferred embodiments, it is to be understood that the invention is not to be limited to the disclosed embodiments, but on the contrary, is intended to cover various modifications and equivalent arrangements as can be included within the spirit and scope of the appended claims.

What is claimed is:

1. A portable sacral support device comprising:
    a main body comprising:
        a vented center relief portion surrounded by and connected to a center support portion;
        relief arms disposed laterally to the center support portion, the relief arms defining a waist portion;
        an upper support portion connected to the center support portion and the relief arms; and
    a padded cover secured to the main body.

2. A portable sacral support device accordingly to claim 1, further comprising:
    a support frame attached to the main body, the support frame comprising: an inner arch; and an outer arch concentric with the inner arch; and
    a pedestal attached to the main body, and a clip attached to the pedestal.

3. A portable sacral support device accordingly to claim 2, wherein a surface of the main body includes ribs, said surface of the main body being proximate to the support frame.

4. A portable sacral support device accordingly to claim 2, wherein the center support portion of the main body is attached to the inner arch of the support frame.

5. A portable sacral support device accordingly to claim 2, wherein the clip is capable of insertion into a seat between a seat back and a seat pan of said seat.

6. A portable sacral support device accordingly to claim 5, wherein the seat clip is at least partially stowable in the device when not in use.

7. A portable sacral support device accordingly to claim 2, wherein each relief arm forms an arc rearwardly curving between its connections to the upper support portion and support skirt.

8. A portable sacral support device accordingly to claim 1, wherein the main body and support frame, each independently, comprise a thermoplastic.

9. A portable sacral support device accordingly to claim 8, wherein the thermoplastic is viscoelastic.

10. A portable sacral support device accordingly to claim 9, wherein the thermoplastic comprises a polyester elastomer.

11. A portable sacral support device accordingly to claim 10, wherein the polyester elastomer has a flex modulus in the range of from about 1200 to about 2500 psi as measured by the ASTM D790 or ISO 178 method for flex modulus determination.

12. A sacral support device accordingly to claim 1, wherein each relief arm independently, with the center support portion, upper support portion, and support skirt, defines an elongated slot portion in the main body.

13. A sacral support device accordingly to claim 1, wherein a surface of the main body includes ribs, said surface of the main body being proximate to the support frame.

14. A sacral support device accordingly to claim 1, wherein the center support portion of the main body is attached to the inner arch of the support frame.

15. A sacral support device accordingly to claim 1, wherein said attachment of the support frame comprises attachment to the frame of the seat back assembly.

16. A sacral support device accordingly to claim 1, wherein said attachment of the support frame comprises attachment to the frame and springs, or to the suspension, of the seat back assembly.

* * * * *